United States Patent [19]

Magara

[11] Patent Number: 5,585,014
[45] Date of Patent: Dec. 17, 1996

[54] METHOD AND APPARATUS FOR ELECTRICAL DISCHARGE MACHINING USING VARIABLE CAPACITANCE AND VARIABLE INDUCTANCE

[75] Inventor: Takuji Magara, Aichi, Japan

[73] Assignee: Mitsubishi Denki Kabushiki Kaisha, Tokyo, Japan

[21] Appl. No.: 268,452

[22] Filed: Jun. 30, 1994

[30] Foreign Application Priority Data

Jun. 30, 1993 [JP] Japan .................................. 5-162803

[51] Int. Cl.⁶ .................................................. B23H 1/02
[52] U.S. Cl. ............................................................. 219/69.13
[58] Field of Search .............................. 219/69.13, 69.18

[56] References Cited

U.S. PATENT DOCUMENTS

| | | | |
|---|---|---|---|
| 2,798,934 | 7/1957 | Bruma | 219/69.13 |
| 3,062,985 | 11/1962 | Webb | 219/69.13 |
| 4,945,199 | 7/1990 | Tanaka et al. | 219/69.13 |
| 5,149,931 | 9/1992 | Magara | 219/69.13 |
| 5,378,866 | 1/1995 | Taneda | 219/69.18 |

FOREIGN PATENT DOCUMENTS

| | | |
|---|---|---|
| 56-134131 | 10/1981 | Japan . |
| 57-33926 | 2/1982 | Japan . |
| 58-137523 | 8/1983 | Japan . |
| 59-182024 | 10/1984 | Japan . |
| 60-213429 | 10/1985 | Japan . |
| 61-260915 | 11/1986 | Japan . |
| 62-109418 | 5/1987 | Japan . |
| 64-5723 | 1/1989 | Japan ......................... 219/69.13 |
| 1115514 | 5/1989 | Japan . |
| 2185316 | 7/1990 | Japan . |
| 2185315 | 7/1990 | Japan . |
| 2262707 | 10/1990 | Japan . |
| 461256 | 2/1992 | Japan . |
| 5-31625 | 2/1993 | Japan ......................... 219/69.13 |

*Primary Examiner*—Geoffrey S. Evans
*Attorney, Agent, or Firm*—Sughrue, Mion, Zinn, Macpeak & Seas

[57] ABSTRACT

An electric discharge machine having a source of pulse power, optionally including bipolar pulses, which is connected to an electrode which forms a gap with a workpiece and is operative to provide both machining and finishing processes. Switching of power to the machining gap and impedance matching at the machining gap, in order to suppress the influence of the capacitance of the high-speed machining feeder cables connected to the machining gap in finishing, is provided so that machining can be performed at high accuracy with a properly timed and shaped discharge current. Impedance matching is provided by selectively switching among plural capacitances or inductances, which may be in the form of cables or printed patterns on a circuit board which have predetermined values, such as a geometric series values of which coefficient is 2.

13 Claims, 24 Drawing Sheets

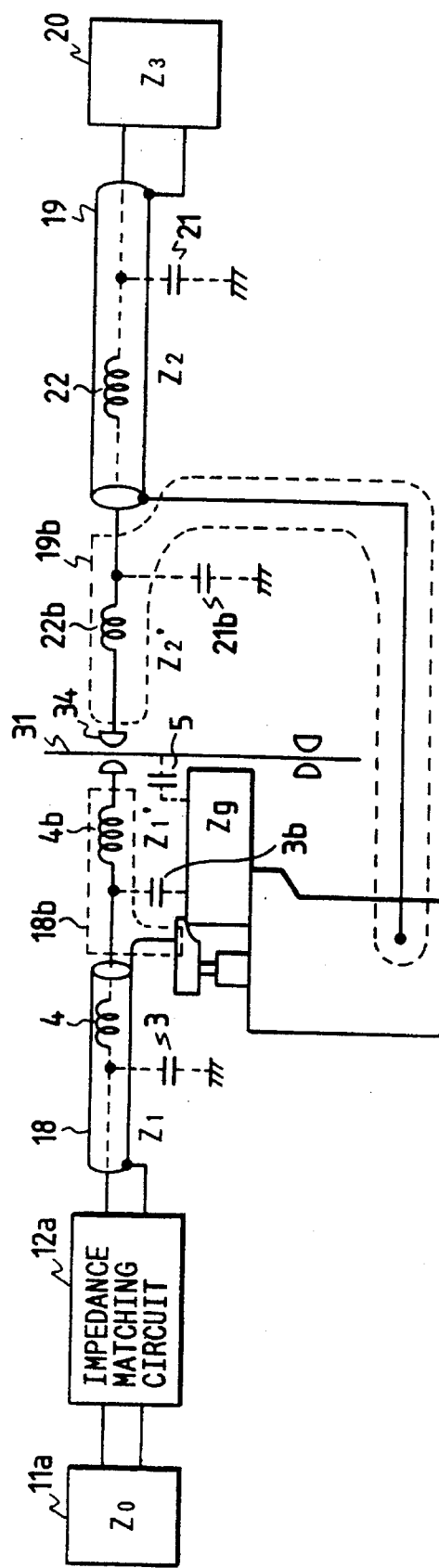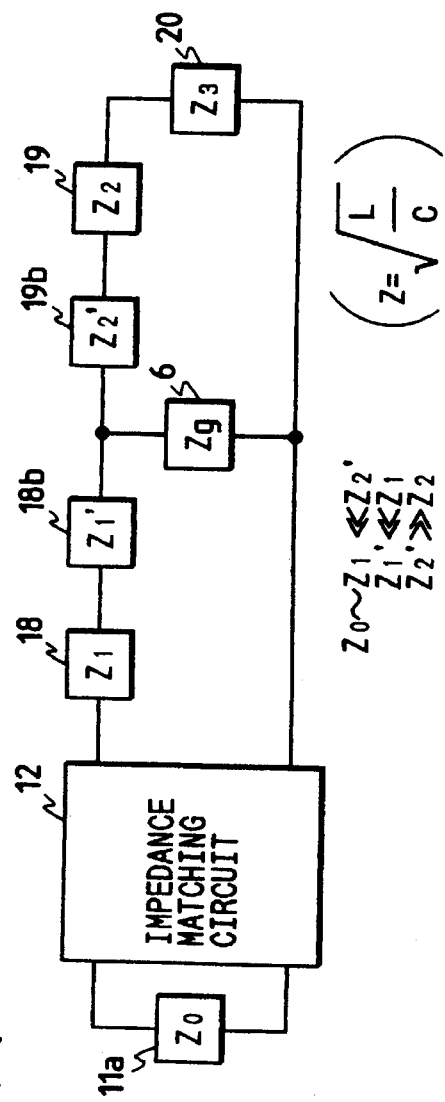
FIG. 2(a)
FIG. 2(b)

VOLTAGE WAVEFORM $\tau_p$ (PULSE WIDTH)

CURRENT WAVEFORM

TO AN IMPEDANCE MATCHING CIRCUIT

TO AN IMPEDANCE MATCHING CIRCUIT

| A CHANGE PATTERN | 40a (2pF) | 40b (4pF) | 40c (8pF) | 40d (16pF) | GROSS CAPACITY |
|---|---|---|---|---|---|
| 0 | 0 | 0 | 0 | 0 | 0pF |
| 1 | 1 | 0 | 0 | 0 | 2pF |
| 2 | 0 | 1 | 0 | 0 | 4pF |
| 3 | 1 | 1 | 0 | 0 | 6pF |
| 4 | 0 | 0 | 1 | 0 | 8pF |
| 5 | 1 | 0 | 1 | 0 | 10pF |
| 6 | 0 | 1 | 1 | 0 | 12pF |
| 7 | 1 | 1 | 1 | 0 | 14pF |
| 8 | 0 | 0 | 0 | 1 | 16pF |
| 9 | 1 | 0 | 0 | 1 | 18pF |
| 10 | 0 | 1 | 0 | 1 | 20pF |
| 11 | 1 | 1 | 0 | 1 | 22pF |
| 12 | 0 | 0 | 1 | 1 | 24pF |
| 13 | 1 | 0 | 1 | 1 | 26pF |
| 14 | 0 | 1 | 1 | 1 | 28pF |
| 15 | 1 | 1 | 1 | 1 | 30pF |

METHOD AND APPARATUS FOR ELECTRICAL DISCHARGE MACHINING USING VARIABLE CAPACITANCE AND VARIABLE INDUCTANCE

BACKGROUND OF THE INVENTION

1. Field of the Invention

The present invention relates to a method and a machine for electrical discharge machining a workpiece and providing finished surfaces of good quality. The invention particularly concerns the use of a variable capacitance and a variable inductance in connection with an impedance matching circuit of the electrical discharge machine.

2. Description of the Background Art

Generally in machining at alternating-current high frequency, it is well known that at an average machining voltage of zero (V), chipping does not occur due to electrolysis and polarity changes from one to the other every half-wave discharge. Accordingly, an excellent machining characteristic is provided which ensures that a high quality machined surface can be obtained every discharge.

For example, Japanese Laid-Open Patent Publication No. SHO61-260915 discloses an electrical discharge machining power supply which can supply a machining gap with the alternating-current high frequency of 1.0 to 5.0 MHz. The power supply can reduce the stray capacitance resulting from the sum of the capacitance existing in feeders and the capacitance formed in the machining gap (between an electrode and a workpiece) to a value equal to or less than 1000 pF. As a result, an excellent surface of not more than 1 µmRmax can be obtained.

However, when the machining gap, machined area etc., vary and/or a discharge status changes in such electrical discharge machining power supply, the impedance of the machining gap changes sharply to substantially vary the output thereof. This creates a problem in that some machining might result in instability, unreproducibility, etc. In the meantime, as means to solve such a problem, Japanese Laid-Open Patent Publication No. HEI1-240223 discloses an example wherein an automatic impedance matching circuit is provided between an alternating-current power supply and the machining gap. This arrangement permits a workpiece to be machined with an automatic adjustment of impedance in response to the changes in machining gap distance and machined area.

FIG. 33 shows the arrangement of a conventional circuit, wherein the numeral 1 indicates a direct-current power supply, 2 denotes a resistor provided for limiting a current, 3 designates a stray capacitance present in feeder cables and the circuit, 4 represents a stray inductance present in the feeder cables and other mechanical structure (such as a feeding section), 5 indicates a machining gap capacitance formed between an electrode and a workpiece, 6 denotes a machining gap formed by the electrode and the workpiece, 7 designates a switching device, 8 represents a drive circuit which drives the switching device 7, 9 denotes a coupling capacitor provided in series between the switching device 7 in the circuit and the machining gap 6, 10 indicates a coupling coil provided similarly in series between the switching device 7 and the machining gap 6, 11 represents an alternating-current, high-frequency machining power supply comprising several of the aforementioned components, and 12 denotes an impedance matching circuit.

FIG. 34 shows the internal circuit arrangement of the conventional automatic impedance matching circuit 12, wherein 13 designates a coupling capacitor, 14 indicates a coil, 15 represents a variable capacitor having a selectable capacitance, 16 denotes an actuator, e.g., a motor, for changing the capacitance of the variable capacitor 15, and 17 designates a drive control circuit which drive-controls the actuator 16.

In operation, the switching device 7 is driven to perform on-off operation, thereby generating an alternating-current, high-frequency voltage as the output of the alternating-current, high-frequency machining power supply 11. The output voltage is supplied as a machining voltage to the machining gap 6 through the automatic impedance matching circuit 12 via the feeder cables to machine a workpiece. Generally, a traveling wave and a reflected wave (an oppositely directed wave reflected at an output end) exist when there is a transmission at high frequency. However, when the matching has been made completely, only the traveling wave is present to provide the maximum output. Namely, the ratio of the reflected wave to the traveling wave must be minimized in order to provide a maximum output.

A high-frequency signal entered into the automatic impedance matching circuit 12 is impedance-matched by the T-shaped matching circuit consisting of the coupling capacitor 13, the coil 14 and the variable capacitor 15 and is supplied to the machining gap 6, at which time the control circuit 17 causes the capacity of the variable capacitor 15 to be changed by the actuator 16 according to a machining status.

According to the art shown in FIGS. 33 and 34, if the impedance of the machining gap changes due to the changes in the size of the machining gap, machined area, machining status, etc., the matching is adjusted to achieve stable, excellent surface machining.

It should be noted that the workpiece must be isolated for machining as shown in FIG. 35 to provide a machined surface of approximately 1 µmRmax in the conventional art. In this drawing, 11 indicates an alternating-current, high-frequency machining power supply, 12 designates an impedance matching circuit, and 18 denotes feeder cables for alternating-current high frequency, which are low-capacitance cables having the capacitance of approximately 100 pF per meter. 19 represents feeder cables for high-speed machining, which have been reduced in inductance to supply a high-peak current waveform but whose capacitance is much larger than that of the feeder cables 18. 20 indicates a high-speed machining power supply, 30 denotes a workpiece, 31 designates a wire electrode, 32 represents a clamp jig, 33 indicates a surface plate, 34 denotes feeders, 23 represents an insulating jig for isolating the workpiece 30 from the surface plate 33, and 24 designates a switch which disconnects and connects the workpiece 30 on the insulating jig 23 from and to the surface plate 33.

The switch 24 is closed in roughing to connect the workpiece 30 to the surface plate 33 whereby the high-peak current is supplied from the high-speed machining power supply 20 to machine the workpiece 30. The feeder cables 19 which supply the high-peak current are low in inductance but are generally large in capacitance. In an commonly used frequency band of approximately 2 MHz, the current flows into the capacitance of the feeder cables 19, thereby leading to difficulty in impedance matching. Also, electrostatic energy accumulated in the feeder cables 19 at the time of a discharge is discharged to the machining gap and results in an increase in the energy of a discharge current waveform, thereby deteriorating the roughness of the machined surface. For this reason, when the workpiece 30 is finished at the alternating-current high frequency, the switch 24 is opened to cause the workpiece 30 to be isolated from the surface plate 33 by the insulating jig 23. In this state, the high-peak current supplying feeder cables 19 is separated from the circuit. This will facilitate the impedance matching at the machining gap. Further, the electrostatic energy accumulated in the low-capacitance feeder cables 18 is small enough to provide the waveform of small current energy. As a result, the finished surface has good quality.

In order to finish a workpiece to a surface of good quality at alternating-current high frequency in the conventional electrical discharge machine arranged as described above, the insulating jig 23 or the like was used to isolate the workpiece 30 from the machine surface plate 33 and the switch 24 was required to disconnect and connect the workpiece 30 on the insulating jig 23 from and to the surface plate 33, which posed problems of machining accuracy, operability and costs.

Also, when the insulating jig 23 is used for alternating-current, high-frequency machining of a workpiece immersed in dielectric fluid, a capacitance is formed between the workpiece 30 and the surface plate 33 via the dielectric fluid and acts to deteriorate the machining quality.

Further, in die-sinking electrical discharge machining which uses an electrode having a large area, if the insulating jig 23 is employed to isolate the workpiece 30 from the machine surface plate 33, the large capacitance formed between the electrode and the workpiece causes machined surface roughness to deteriorate, whereby a machined surface of good quality cannot be provided.

Also, since the variable capacitor 15 was varied by the actuator 16 in order to provide matching in the impedance matching circuit 12 of the conventional electrical discharge machine, the machine was complicated, the fitting of the circuit was difficult, and the costs were high.

Also, particularly when a machined area varies greatly or power supply frequency changes in the electrical discharge machine, it is necessary to switch between a plurality of inductances in the impedance matching circuit 12. Since this switching was also designed to be complementary to that of said variable capacitor 15, the machine was complicated, the fitting of the circuit was difficult, and the costs were high.

It is accordingly an object of the present invention to overcome the disadvantages in the conventional art by providing a method and a machine for electrical discharge machining which can eliminate the influence of capacitances formed in high-speed machining feeder cables and formed between an electrode and a workplace upon a machining gap, provide machined surfaces of good quality, and improve operability and cost performance greatly.

It is another object of the present invention to provide a low-cost, compact, variable-capacitance apparatus of high accuracy which can form a low-level capacitance easily and has high accuracy.

It is a further object of the present invention to provide a low-cost, compact, variable-inductance apparatus of high accuracy which can design and form a low-level inductance easily and has high accuracy.

SUMMARY OF THE INVENTION

In an electrical discharge machining method concerned with the present invention, a high peak current is supplied to a machining gap formed between an electrode and a workpiece through high-speed machining feeder cables to machine the workpiece at high speed, and an alternating-current, high-frequency current is supplied to said machining gap through alternating-current, high-frequency machining feeder cables to finish the workpiece. Impedance matching is conducted on the machining gap to suppress the influence of the capacitance of the high-speed machining feeder cables connected to the machining gap in order to achieve high quality finishing.

Also, in an electrical discharge machine concerned with the present invention, there are high-speed machining feeder cables are connected electrically to the electrode and the workpiece at one end, alternating-current, high-frequency machining feeder cables connected electrically to the electrode and the workpiece at one end, a high-speed machining power supply which supplies said machining gap with the high peak current through said high-speed machining feeder cables in high-speed machining, an alternating-current, high-frequency machining power supply which supplies the machining gap with the alternating-current, high-frequency current through said alternating-current, high-frequency machining feeder cables in finishing, and an impedance matching circuit which conducts impedance matching on the machining gap to suppress the influence of the capacitance of the high-speed machining feeder cables electrically connected to the electrode and the workpiece in finishing.

Also, an electrical discharge machine concerned with the present invention comprises high-speed machining feeder cables connected electrically to the electrode and the workpiece at one end, alternating-current, high-frequency machining feeder cables connected electrically to the electrode and the workpiece at one end, a high-speed machining power supply which supplies said machining gap with the high peak current through said high-speed machining feeder cables in high-speed machining, an approximately 7 to 30 MHz, alternating-current, high-frequency machining power supply which supplies the machining gap with the alternating-current, high-frequency current through said alternating-current, high-frequency machining feeder cables in finishing, and an impedance matching circuit which conducts impedance matching on the machining gap to suppress the influence of the capacitance of the high-speed machining feeder cables electrically connected to the electrode and the workpiece in finishing.

Also, in an electrical discharge machine concerned with the present invention which machines a workpiece with the application of a direct-current pulse voltage to a machining gap formed between an electrode and the workpiece, an impedance matching circuit which conducts impedance matching on the machining gap so that a capacitor discharge current is not caused by a machining gap capacitance to flow prior to a direct-current square-wave current after discharge occurrence is provided between a direct-current pulse power supply and said machining gap.

Also, in an electrical discharge machine concerned with the present invention which machines a workpiece with the application of a bipolar pulse voltage to a machining gap formed between an electrode and the workpiece, an impedance matching circuit which conducts impedance matching on the machining gap so that a capacitor discharge current is not caused by a machining gap capacitance to flow prior to a direct-current square-wave current after discharge occurrence at one polarity is provided between a bipolar pulse power supply and said machining gap.

Also, in an electrical discharge machine concerned with the present invention which machines a workpiece with the application of a bipolar pulse voltage to a machining gap formed between an electrode and the workpiece, an impedance matching circuit which shuts off a discharge arc after a capacitor discharge current caused by a machining gap capacitance to flow prior to a direct-current square-wave current after discharge occurrence at one polarity to conduct impedance matching on the machining gap so that the square-wave current does not persist is provided between a bipolar pulse power supply and said machining gap.

Also, in said electrical discharge machine concerned with the present invention, impedance matching circuits are provided for both polarities independently of each other.

Also, in an electrical discharge machine concerned with the present invention which machines a workpiece with the application of an alternating-current, high-frequency voltage to a machining gap formed between an electrode and the workpiece and includes an impedance matching circuit between a power supply for supplying said voltage and the machining gap, said impedance matching circuit comprises a plurality of capacitors, at least one coil, and switching means which switches between said plurality of capacitors to conduct impedance matching.

Also, in an electrical discharge machine concerned with the present invention which machines a workpiece with the application of a voltage to a machining gap formed between an electrode and the workpiece and includes an impedance matching circuit between a power supply for supplying said voltage and the machining gap said impedance matching circuit comprises a plurality of capacitances formed by patterns on a printed circuit board, at least one coil, and switching means which switches between said plurality of capacitances to conduct impedance matching.

Also in an electrical discharge machine concerned with the present invention which machines a workpiece with the application of a voltage to a machining gap formed between an electrode and the workpiece and includes an impedance matching circuit between a power supply for supplying said voltage and the machining gap, said impedance matching circuit comprises a plurality of capacitances formed by a plurality of cables at least one coil, and switching means which switches between said plurality of capacitances to conduct impedance matching.

Also in the electrical discharge machine concerned with the present invention, the plurality of capacitances in said impedance matching circuit have geometric series values of which coefficient is approximately 2.

Also, in the electrical discharge machine concerned with the present invention, the set values of the plurality of capacitances in said impedance matching circuit are increased in proportion to compensation made for the influence of the capacitance of the switching means which switches between the plurality of capacitances in the impedance matching circuit.

Also, an electrical discharge machine concerned with the present invention, which machines a workpiece with the application of a direct-current pulse voltage or a bipolar pulse voltage to a machining gap formed between an electrode and the workpiece, comprises an impedance matching circuit provided between a power supply which supplies said direct-current pulse voltage or bipolar pulse voltage and the machining gap, a switching device inserted in series with said impedance matching circuit to connect and disconnect said impedance matching circuit entirely, and a bypass circuit connected in parallel with a series circuit consisting of said impedance matching circuit and switching device.

Also, an electrical discharge machine concerned with the present invention, which machines a workpiece with the application of a direct-current pulse voltage or a bipolar pulse voltage to a machining gap formed between an electrode and the workpiece, comprises an impedance matching circuit provided between a power supply which supplies said direct-current pulse voltage or bipolar pulse voltage and the machining gap, a bypass circuit connected in parallel with said impedance matching circuit, and a switching device inserted in series with said bypass circuit to connect and disconnect said bypass circuit entirely.

Also, in an electrical discharge machine concerned with the present invention which machines a workpiece with the application of a direct-current pulse voltage to a machining gap formed between an electrode and the workpiece, a series circuit of a resistor and an inductance is inserted in parallel with the machining gap.

Also, in an electrical discharge machine concerned with the present invention which machines a workpiece with the application of a direct-current pulse voltage to a machining gap formed between an electrode and the workpiece, a series circuit of a resistor and an inductance is inserted in parallel with the machining gap, and driving means for high-frequency switching a switching device for supplying said direct-current pulse is provided to repeat on-off operation at high frequency for a given period of time and subsequently to provide a given period of stop time for machining.

Also, in an electrical discharge machine concerned with the present invention which machines a workpiece with the application of a direct-current pulse voltage to a machining gap formed between an electrode and the workpiece, a series circuit consisting of a resistor, an inductance and a switching device is inserted in parallel with the machining gap and said switching device is turned on after a discharge.

Also, in an electrical discharge machine concerned with the present invention which machines a workpiece with the application of a voltage to a machining gap formed between an electrode and the workpiece and includes an impedance matching circuit between a power supply which supplies said voltage and the machining gap, said impedance matching circuit comprises a plurality of inductances formed by patterns on a printed circuit board, and switching means which switches between said plurality of inductances.

Also, in an electrical discharge machine concerned with the present invention which machines a workpiece with the application of a voltage to a machining gap formed between an electrode and the workpiece and includes an impedance matching circuit between a power supply which supplies said voltage and the machining gap, said impedance matching circuit comprises a plurality of inductances formed by a plurality of cables, and switching means which switches between said plurality of inductances.

Also, in the electrical discharge machine concerned with the present invention, the set values of the plurality of inductances in said impedance matching circuit are decreased in proportion to compensation made for the influence of the inductance of the switching means which switches between the plurality of inductances in the impedance matching circuit.

Also, a variable capacitance apparatus concerned with the present invention comprises a plurality of capacitances formed by patterns on a printed circuit board, and switching means which switches between said plurality of capacitances.

Also, a variable capacitance apparatus concerned with the present invention, which changes a capacitance by switching between a plurality of capacitances, comprises a plurality of capacitances formed by a plurality of cables, and switching means which switches between said plurality of capacitances.

Also, in said variable capacitance apparatus concerned with the present invention, the set values of the plurality of capacitances are increased in proportion to compensation made for the influence of the capacitance of the switching means which switches between said plurality of capacitances.

Also, a variable inductance apparatus concerned with the present invention, which changes an inductance by switching between a plurality of inductances, comprises a plurality of inductances formed by patterns on a printed circuit board, and switching means which switches between said plurality of inductances.

Also, a variable inductance apparatus concerned with the present invention which changes an inductance by switching between a plurality of inductances, comprises a plurality of inductances formed by a plurality of cables, and switching means which switches between said plurality of inductances.

Further, in said variable inductance apparatus concerned with the present invention, the set values of the plurality of inductances are decreased in proportion to compensation made for the influence of the inductance of the switching means which switches between said plurality of inductances.

BRIEF DESCRIPTION OF THE DRAWINGS

FIGS. 2(a) and 2(b) illustrate an actual circuit arrangement in the first embodiment of the present invention.

DESCRIPTION OF THE PREFERRED EMBODIMENTS

Figure 1:
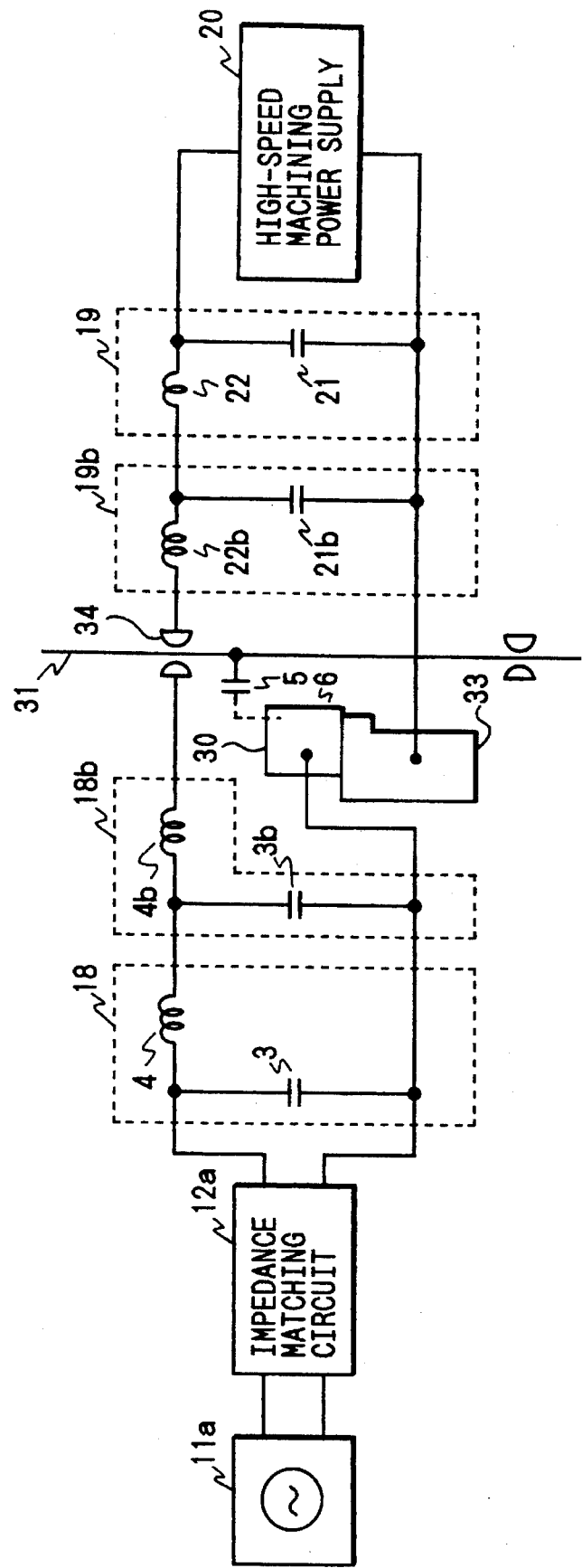
FIG. 1 illustrates a circuit arrangement of a first embodiment of the present invention.

The first embodiment of the present invention will now be described in accordance with FIGS. 1 to 6. FIGS. 1, 2(a) and 2(b) are arrangement diagrams concerned with the present embodiment, wherein the numeral 11a indicates an alternating-current, high-frequency machining power supply which supplies a 7 MHz to 30 MHz high-frequency output, 12a represents an impedance matching circuit, and 18 designates alternating-current, high-frequency machining feeder cables connected directly to a machining gap. 3 denotes a stray capacitance existing in the alternating-current, high-frequency machining feeder cables 18, which is normally approximately 300 pF. 4 indicates a stray inductance existing in the alternating-current, high-frequency machining feeder cables 18, which is normally approximately 1 μH. 18b represents a machining gap connection of the feeder cables 18, 3b designates a stray capacitance in the terminal portion of the feeder cables 18, and 4b denotes a stray inductance in the terminal portion of the feeder cables 18.

5 indicates a machining gap capacitance formed between an electrode and a workpiece, 6 designates a machining gap formed by the electrode and the workpiece, 20 represents a high-speed machining power supply, and 19 denotes high-speed machining feeder cables connected directly to the machining gap 6 like the alternating-current, high-frequency machining feeder cables 18. 21 represents a stray capacitance present in the high-speed machining feeder cable 19 and the circuit, which is usually about 10000 pF. 22 denotes a stray capacitance existing in the high-speed machining feeder cables 19 and in other mechanical structures of the machine (e.g., feeding section), which is usually approximately 0.2 μH. 19b indicates a machining gap connection of the feeder cables 19, 21b designates a stray capacitance in the terminal portion of the feeder cables 19, and 22b denotes a stray inductance in the terminal portion of the feeder cables 19.

FIGS. 2(a) and 2(b) are an actual circuit diagram of FIG. 1, wherein Z0 indicates an output impedance of the alternating-current, high-frequency power supply 11a, Z1 designates a characteristic impedance of the feeder cables 18, Z1' represents an impedance of the terminal portion (machine connection portion) of the feeder cables 18, Z3 denotes an output impedance of the high-speed machining power supply 20, Z2 indicates a characteristic impedance of the feeder cables 19, Z2' represents an impedance of the terminal portion (machine connection portion) of the feeder cables 19, and Zg denotes an output impedance of the machining gap 6. It is to be understood that Z2' is normally large among the above impedances.

When impedance matching is conducted to achieve Z0=Z1+Zg, the following state results:

$$Z0=Z1+Zg'>Z2'(Z1'<Z1, Z2'>Zg)$$

In operation, as in the conventional example, an alternating-current, high-frequency voltage is generated as the output of the alternating-current, high-frequency machining power supply 11a. The frequency used herein is 7 MHz to 30 MHz as opposed to that of approximately 1.0 to 5.0 MHz employed in the conventional example. The output voltage is supplied as a machining voltage to the machining gap 6 through the impedance matching circuit 12a via the feeder cables to machine the workpiece. A high-frequency signal entered into the impedance matching circuit 12a causes the machining gap 6 in a discharge state to be matched by, for example, a T-shaped matching circuit consisting of the coupling capacitor 13, the coil 14 and capacitors 40a to 40d shown in FIG. 9 to machine the workpiece. When 7 MHz to 30 MHz is employed as the frequency of the alternating-current used in machining, on the assumption that the values of the capacitors 13, 15 are 50 to 100 pF and that of the coil 14 1 to 3 μH or so, impedance matching can be made to enable the machining if the high-speed machining feeder cables 19 having a large capacitance are connected to the machining gap, ensuring stable machining.

Also, since a 7 MHz to 30 MHz frequency is used for the alternating-current, in order to conduct impedance matching and to avoid a mismatching connection due to the impedance Zg' of the high-speed machining feeder cable terminal portion 19b being large as described above, reflection takes place in this portion and the current does not flow to the capacitance 21 of the feeder cables 19, whereby the influence of the capacitance 21 can be eliminated or suppressed. As a result, a mirror surface of not more than 0.5 μmRmax can be provided. According to experiments, a finished surface of 0.2 μmRmax was obtained in the machining of a carbide material 20 mm in plate thickness.

Figure 3A:
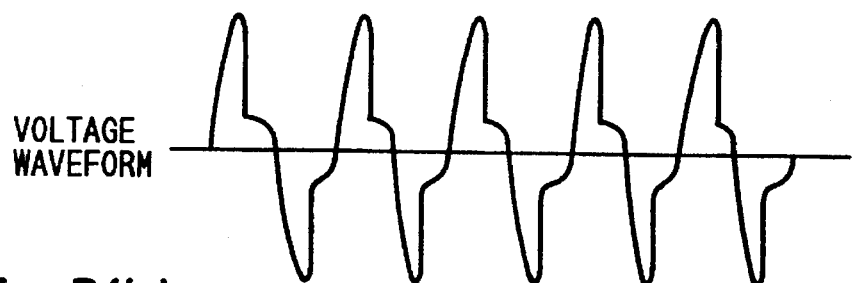
FIGS. 3(a), 3(b) and 3(c) illustrate the machining characteristics in the first embodiment of the present invention.
Figure 3B:
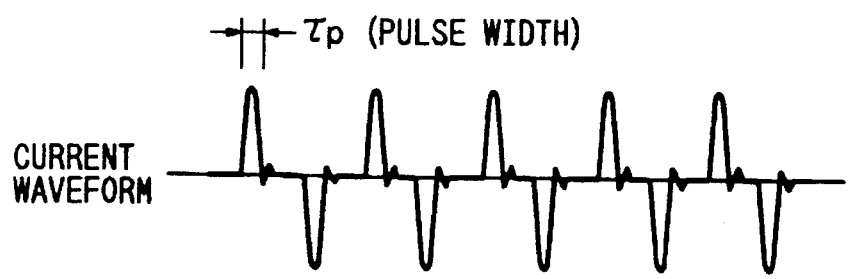
Figure 3C:
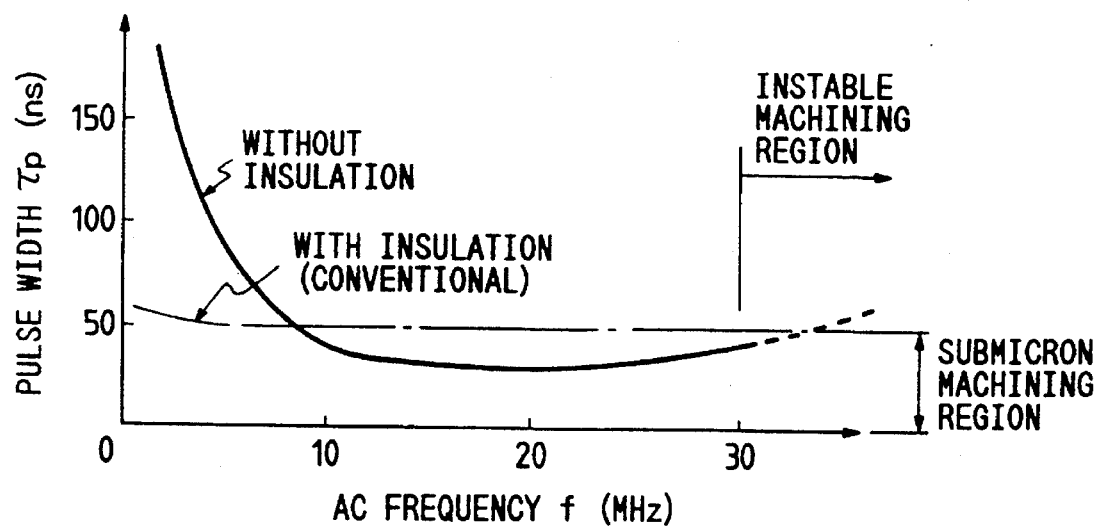

FIGS. 3(a), 3(b) and 3(c) show machining characteristics relevant to the present embodiment. These drawings indicate clearly that in the conventional example wherein insulation is used to shut off the capacitance, a current waveform of approximately 50 ns pulse width is provided in a region not more than 5 MHz, while, when insulation is not provided, the pulse width increases considerably in the region not more than 5 MHz because charge and discharge are made to the capacitance. Such pulse width influences machined surface roughness, i.e. as the pulse width is made smaller, the surface roughness gets better, and a near-mirror surface of not more than 1 μmRmax is generally obtained in the pulse region of not more than 50 ns. This indicates that when the capacitance is not isolated as in the present embodiment, an excellent machined surface cannot be provided in the region of 5 MHz or lower. However, it also shows that when the frequency is further increased to the region of 7 MHz or higher, the current pulse width up can be reduced to or below approximately 50 ns because of a shorter length of time required for voltage polarity switching, thereby permitting fine machining of not more than 1 μmRmax if the capacitance is not shut off.

It should be noted that where the frequency of the alternating-current is too high, there is a difficulty in impedance matching at the machining gap, resulting in an instability in machining characteristic in response to the variation of the capacitance existing in the machining gap, and a persistent alternating-current arc in a high-frequency region that will roughen the machined surface. Hence, the frequency appropriate for electrical discharge machining is between 7 MHz and 30 MHz.

In order to perform stable impedance matching on the machining gap 6 during machining, the impedance Z1' of the alternating-current high-frequency feeder cable terminal portion 18b must be reduced. For this purpose, it is important to connect the alternating-current high-frequency feeder cables 18 as close as possible to the machining gap and reduce the stray inductance 4b to ensure stable impedance matching. FIGS. 4(a), 4(b), 5 and 6 show examples of ways to connect alternating-current, high-frequency feeder cables 18 as close as possible to the machining gap.

Figure 4A:
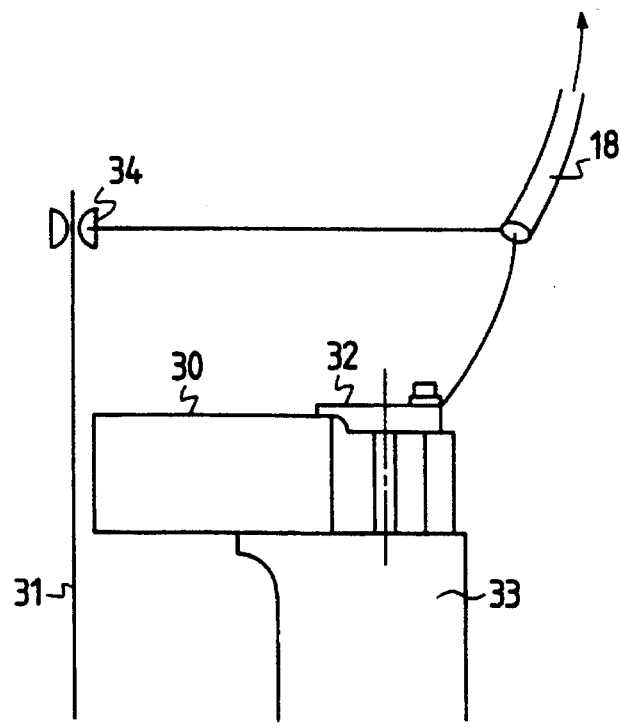
FIGS. 4(a) and 4(b) illustrate examples of feeder connection areas in the first embodiment of the present invention.
Figure 4B:
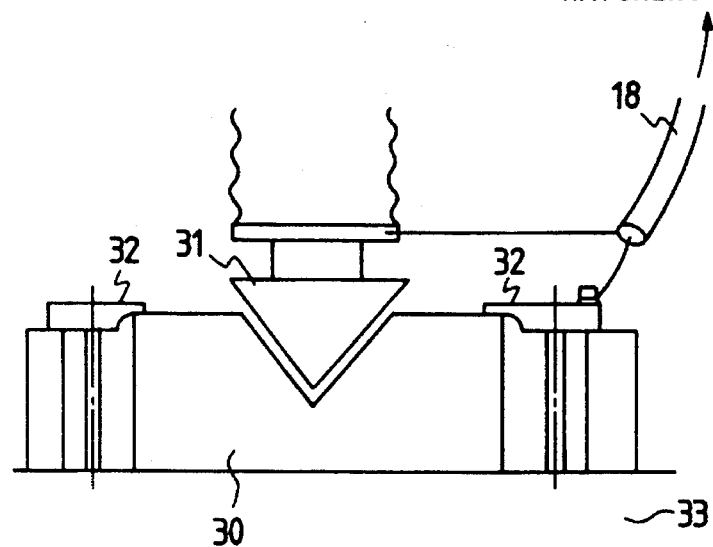

FIG. 4(a) shows the connection area of the alternating-current, high-frequency machining feeder cables 18 in a wirecut electrical discharge machine, wherein 18 indicates alternating-current, high-frequency machining feeder cables, 30 denotes a workpiece, 31 designates a wire electrode, 32 represents a workpiece clamping jig, 33 indicates a surface plate, and 34 represents feeders for the wire electrode. FIG. 4(b) shows the connection area of the alternating-current, high-frequency machining feeder cables 18 in a die-sinking electrical discharge machine, wherein, similarly, 18 indicates alternating-current, high-frequency machining feeder cables, 30 designates a workpiece, 31 represents an electrode, 32 denotes a workpiece clamping jig, and 33 indicates a surface plate. In these examples, the clamp jig 32 is provided with a feeder cable fitting screw and the alternating-current, high-frequency machining feeder cables 18 are fitted directly to the clamp jig 32 for machining.

Figure 5:
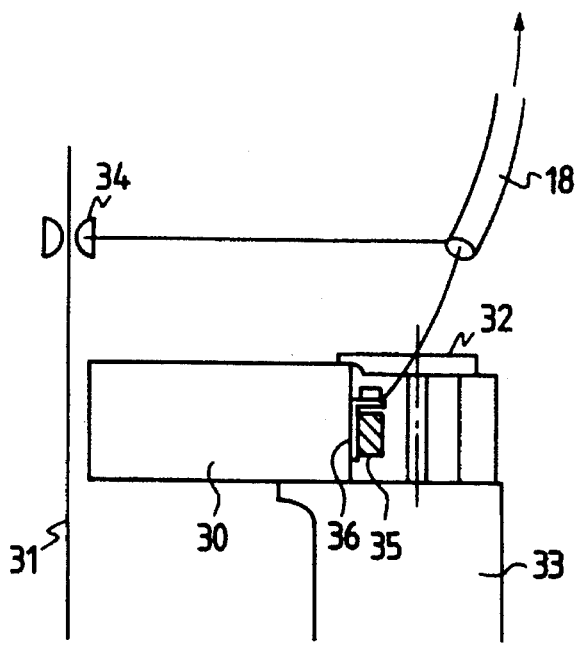
FIG. 5 illustrates an alternative example of a feeder connection area in the first embodiment of the present invention.

FIG. 5 shows an alternative embodiment of the connection area of the alternating-current, high-frequency machining feeder cables 18, wherein 18 indicates alternating-current, high-frequency machining feeder cables, 30 denotes a workpiece, 31 designates an electrode, 32 represents a workpiece clamping jig, 33 indicates a surface plate, 34 represents feeders for the wire electrode, 35 denotes a magnet, and 36 designates a copper terminal. In this embodiment, the alternating-current, high-frequency machining feeder cables 18 are fixed to the workpiece 30 by the magnet 35 for feeding. The magnet 35 may be secured in any position of the workpiece 30 for machining.

Figure 6:
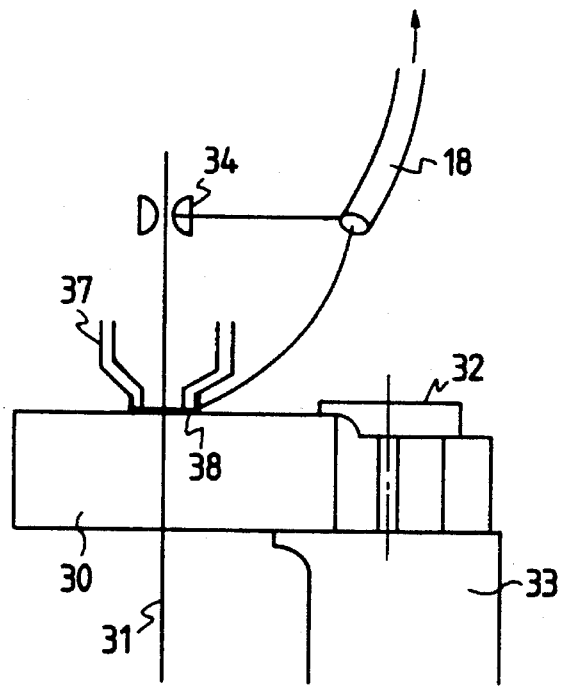
FIG. 6 illustrates a further alternative example of a feeder connection area in the first embodiment of the present invention.

FIG. 6 shows a further alternative embodiment of the connection area of the alternating-current, high-frequency machining feeder cables 18, wherein 18 indicates alternating-current, high-frequency machining feeder cables, 30 designates a workpiece, 31 denotes an electrode, 32 represents a workpiece clamping jig, 33 indicates a surface plate, 34 denotes feeders for the wire electrode, 37 represents a dielectric nozzle, and 38 designates a feeding contactor which is fitted to the end of the dielectric nozzle 37. The contactor 38 is connected with the alternating-current, high-frequency machining feeder cables 18, and maintains contact with the top surface of the workpiece 30 during machining to feed the workpiece 30. In this embodiment, the relationship between the machining gap and the machined portion are kept uniform during machining to offer stable impedance matching.

The second embodiment of the present invention will now be described in accordance with FIGS. 7 to 10(a)–(c). It is to be understood that this embodiment is concerned with an impedance matching circuit that may be used in the first embodiment and with the impedance control of the impedance matching circuit.

Figure 7:
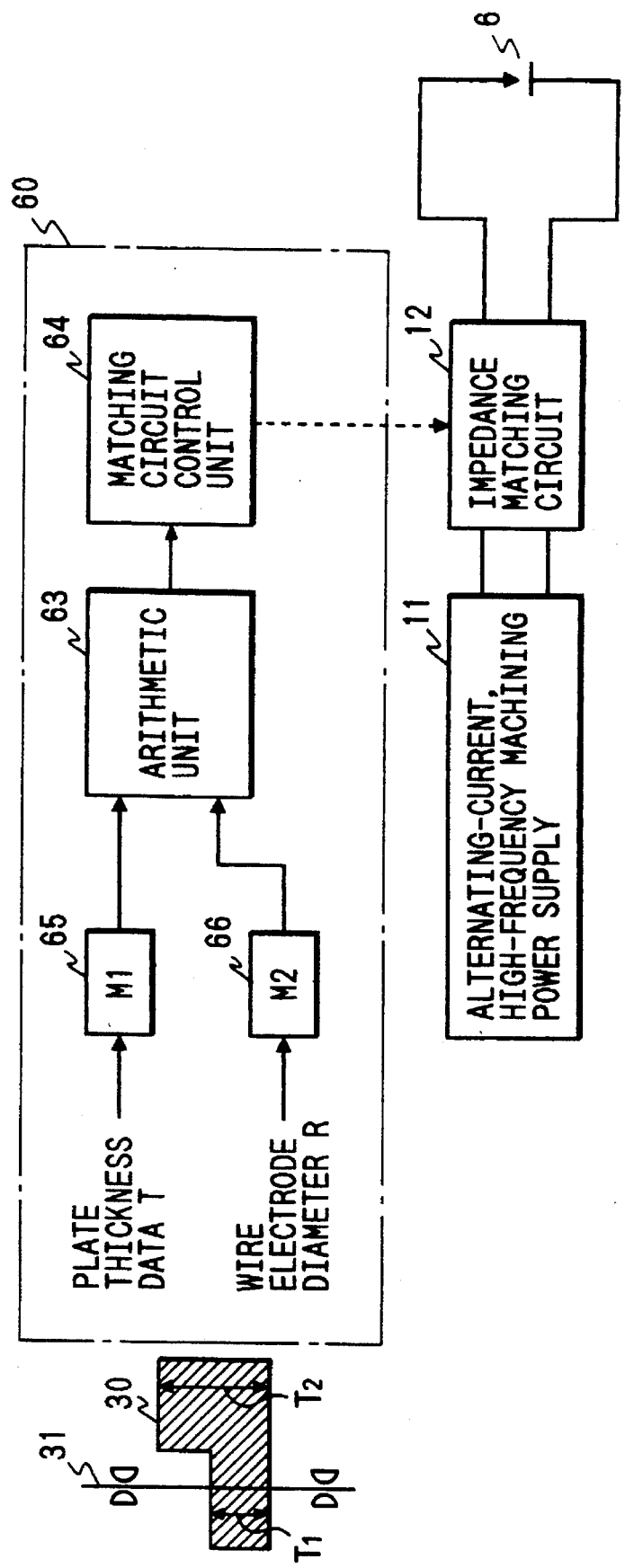
FIG. 7 illustrates an impedance control circuit for an impedance matching circuit employed in a wirecut electrical discharge machine in accordance with a second embodiment of the present invention.

FIG. 7 shows an impedance control circuit for an impedance matching circuit used in a wirecut electrical discharge machine. In the drawing, 30 indicates a workpiece, 31 designates a wire electrode, 11 denotes an alternating-current, high-frequency machining power supply, 12 represents an impedance matching circuit, 6 indicates a machining gap, 60 denotes a control apparatus, 65 represents a storage device provided in the control apparatus 60 to store machined plate thickness information T, 66 indicates a storage device provided similarly in the control apparatus 60 to store wire electrode diameter information, 63 represents an arithmetic unit which finds the manipulated value of the impedance matching circuit 12 from the information of the storage devices 65, 66, and 64 designate matching circuit control unit which controls the impedance matching circuit 12 on the basis of the operation results of the arithmetic unit 63.

Figure 8:
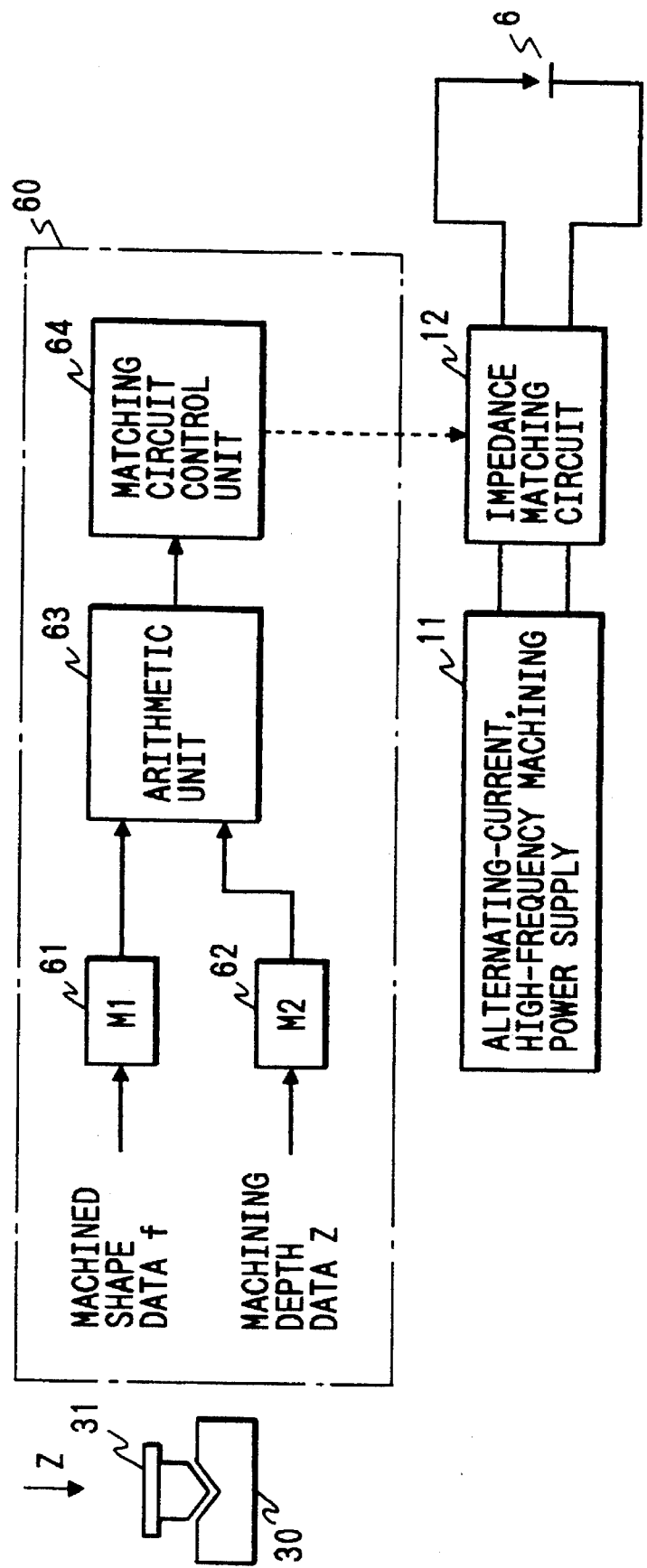
FIG. 8 illustrates an impedance control circuit for an impedance matching circuit employed in a die-sinking electrical discharge machine in accordance with the second embodiment of the present invention.

FIG. 8 shows an impedance control circuit for an impedance matching circuit employed in a die-sinking electrical discharge machine. In the drawing, 30 indicates a workpiece, 31 designates an electrode, 11 denotes an alternating-current, high-frequency machining power supply, 12 represents an impedance matching circuit, 6 indicates a machining gap, 60 denotes a control apparatus, 61 represents a storage device provided in the control apparatus 60 to store machined shape information, 62 indicates a storage device provided similarly in the control apparatus 60 to store machining depth information, 63 represents an arithmetic unit which finds the manipulated value of the impedance matching circuit 12 from the information of the storage devices 61, 62, and 64 designates matching circuit control unit which controls the impedance matching circuit 12 from the operation results of the arithmetic unit 63.

Figure 9:
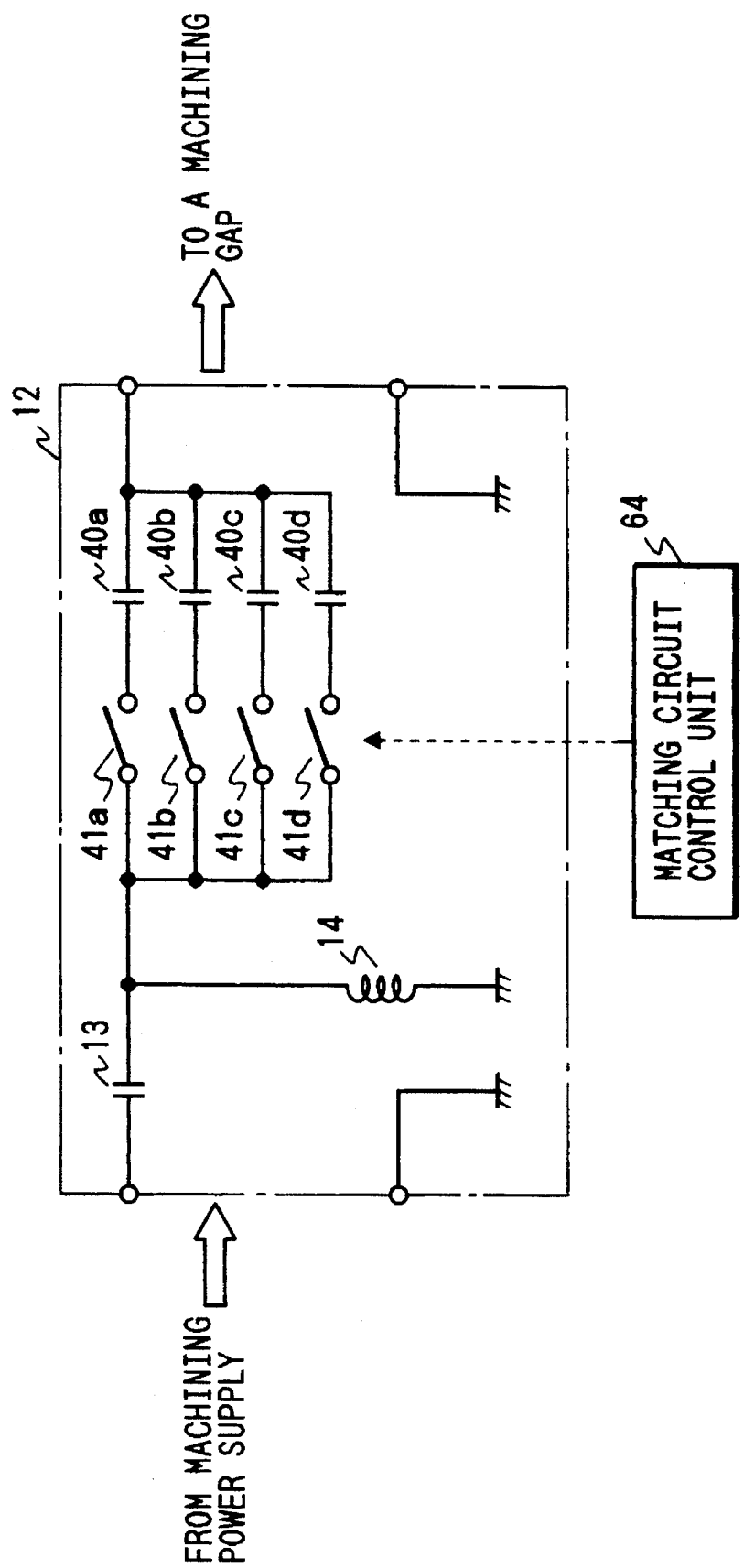
FIG. 9 illustrates an example of the impedance matching circuit in the second embodiment of the present invention.

FIG. 9 shows the internal circuit arrangement of the impedance matching circuit 12 in the second embodiment of the present invention, wherein 13 indicates a coupling capacitor, 14 represents a coil, 40a to 40d designate capacitors different in value from each other, and 41a to 41d denote relays which switch between the capacitors 40a to 40d. FIG. 10 is a table and graph showing the combinations of the capacitors 40a to 40d and the sums of their capacitances.

In operation, referring to the above drawings, when the workpiece is machined using a high frequency alternating-current, impedance matching must be performed on the machining gap according to the machined plate thickness, machined area, etc. First, in the case of the wirecut electrical discharge machining, the arithmetic unit 63 selects the manipulated value of the impedance matching circuit 12 on the basis of the plate thickness information stored in the storage devices 65 in the control apparatus 60 and the wire electrode diameter information stored in the storage device 66 as shown in FIG. 7. Namely, the arithmetic unit 63 has data corresponding to machined plate thickness T and wire electrode diameter R preset in the form of a table and outputs from this data table the information for controlling the impedance matching circuit 12. In accordance with the output result of this arithmetic unit 63, the matching circuit control unit 64 controls the impedance matching circuit 12. Specifically, a 4-bit command signal is output from the matching circuit control unit 64 according to the magnitude of the plate thickness, and the relays 41a to 41d in the impedance matching circuit 12 are driven under the control of that command signal to select between the capacitors 40a to 40d. That is, the matching circuit control unit 64 outputs a 4-bit command signal for matching so that a large value is selected as the capacitance of the capacitors 40 when the machined plate thickness has increased. If the plate thickness does not change during machining, the plate thickness information is entered beforehand at the input to the control apparatus by an operator. If the plate thickness changes during machining, plate thickness change information may be entered using an NC program or impedance matching may be made as appropriate on the basis of plate thickness information obtained by inferring the change in plate thickness using the changes in machining speed, etc.

Figures 10A, 10B:
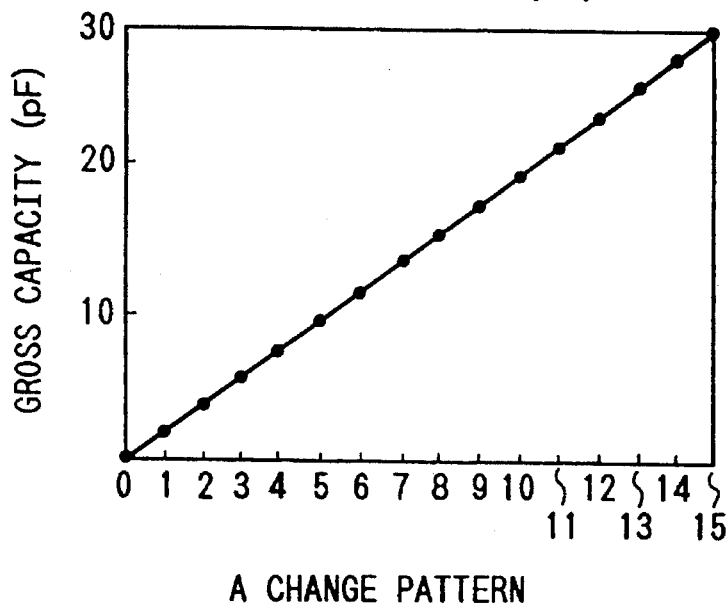
FIGS. 10(a) and 10(b) illustrate the operation of the impedance matching circuit in the second embodiment of the present invention.

The capacitors 40a to 40d are preset to have geometric series values, preferably with a coefficient of approximately 2. For example, as shown in FIG. 10(a), the values will be 2 pF for the capacitor 40a, 4 pF for the capacitor 40b, 8 pF for the capacitor 40c and 16 pF for the capacitor 40d. This will ensure that any of 16 different consecutive capacitance values can be chosen according to the combination of the four capacitors as shown in FIG. 10(b). Especially in wirecut electrical discharge machining wherein an area change in the machining gap 6 is small and the capacitance need not be changed in an extremely extensive range to make impedance matching, the simple switching between 4 bits or so allows matching to be made sufficiently.

It is to be noted that the composition result of low-level capacitances (1 to 2 pF) present in the relays 41a to 41d and said capacitances is the actual sum of capacitances. To select the exact capacitance, slightly larger values must be set as the values of 40a to 40d.

Specifically, for instance, if the capacitances of the relay terminals 41a to 41d are 1.4 pF each, those of the capacitors are to be set as follows:

Capacitor 40a: 2.9 pF

Capacitor 40b: 5.1 pF

Capacitor 40c: 9.2 pF
Capacitor 40d: 17.3 pF
to select the exact capacitance.

In the case of die-sinking electrical discharge machining, the arithmetic unit 63 calculates a machined area on the basis of the machined shape information stored in the storage 61 in the control apparatus 60 and the machining depth information stored in the storage devices 62 as shown in FIG. 8. In accordance with this calculation result, the matching circuit control unit 64 controls the impedance matching circuit 12. Specifically, a 4-bit command signal is output from the matching circuit control unit 64 according to the magnitude of the machined area, and the relays 41a to 41d in the impedance matching circuit 12 are driven under the control of the command signal to select between the capacitors 40a to 40d. Here, the matching circuit control unit 64 outputs the 4-bit command signal for matching so that larger values are selected as the capacitances of the capacitors 40 when the machined area increases.

Whereas the present embodiment gave the example wherein the machined shape information was stored beforehand in the control apparatus 60 and the machined area was calculated according to the change in machining depth, area change information may be entered using an NC program or impedance matching may be made as appropriate on the basis of machined area information obtained by inferring the change in machined area using another machined area detecting means or the like.

Also, while the present embodiment provided the example wherein the four capacitors 40a to 40d were available and the capacitance was switched between 16 different steps by the 4-bit data, the number of capacitors 40 and relays 41 may be increased for a great change in the machining gap in die-sinking electrical discharge machining or the like to switch between the capacitances more accurately in a wider range, thereby performing impedance matching in an extensive range.

Figure 11A:
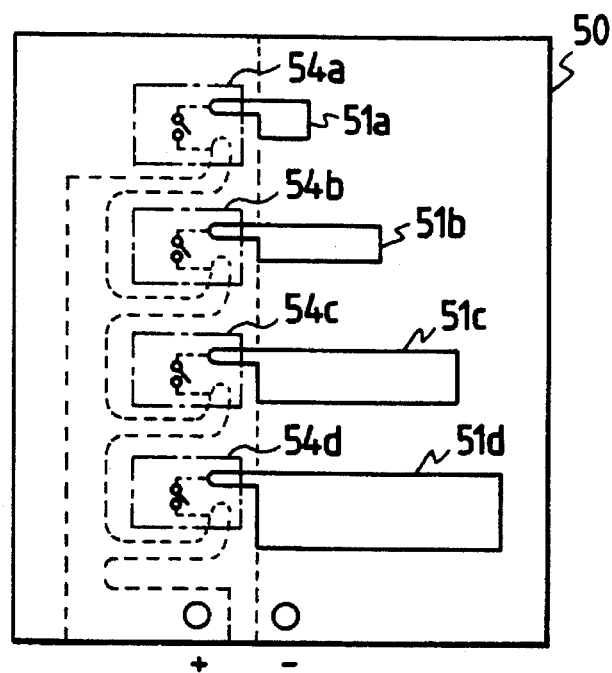
FIGS. 11(a)–11(c) illustrate an arrangement example of an impedance matching circuit in a third embodiment of the present invention.
Figure 11B:
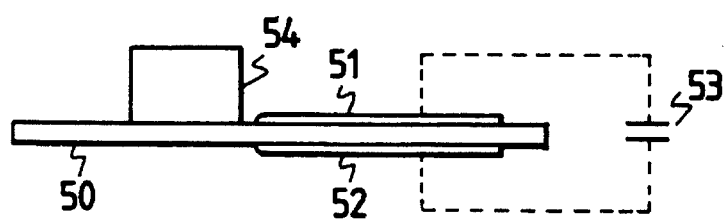
Figure 11C:
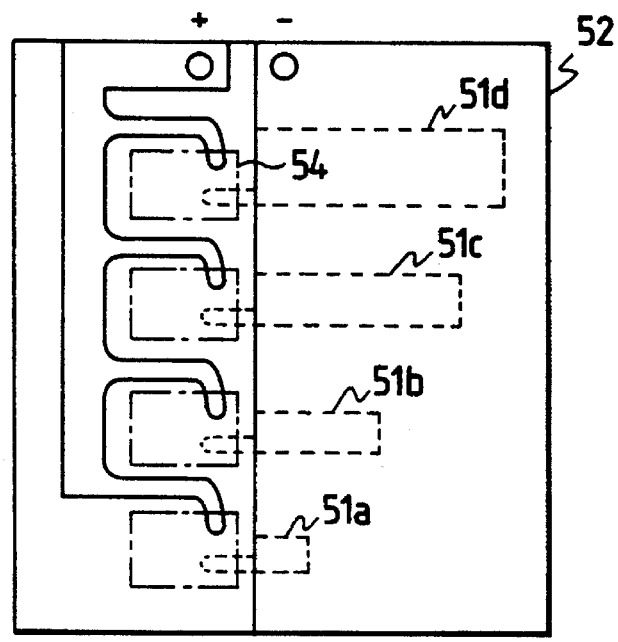

The third embodiment of the present invention will now be described in accordance with FIGS. 11(a)–(c), 12 and 13. Since a plurality of capacitors in the impedance matching circuit in the electrical discharge machine have extremely small values of approximately several pF, general capacitors are often inadequate to satisfy the required accuracy. FIGS. 11(a)–(c) show an embodiment wherein a plurality of capacitors in the impedance matching circuit 12 in such an electrical discharge machine are constituted by patterns on a printed circuit board. In this drawing, 50 indicates a printed circuit board, 51a to 51d designate print patterns which are formed on one side of the printed circuit board 50 and have different areas from each other, 52 denotes print patterns formed on an opposite side to the print patterns 51a to 51d, 53 represents capacitances formed between the print patterns 51 and the print patterns 52, and 54a to 54d indicate relays connected to the print patterns 51a to 51d respectively.

Operation will now be described. When the relays 54a to 54d are closed by the matching circuit control unit 64 in the drawing, the capacitances are formed between the print patterns 51a to 51d and the print patterns 52 and any of 16 steps of capacitances can be chosen by switching between the relays 54a to 54d. The capacitance of each print pattern is determined by a print pattern 51 area and a print pattern distance (≈ the thickness of the board). For a general printed circuit board, a capacitance of approximately 2 pF is formed per cm 2. The areas of the print patterns 51a to 51d are preset so that the capacitor values have geometric series values of which coefficient is approximately 2, e.g. 2 pF for the capacitance 53a, 4 pF for the capacitance 53b, 8 pF for the capacitance 53c and 16 pF for the capacitance 53d, to ensure that any of 16 different consecutive capacitance values can be chosen according to the combination of the four print patterns as shown in FIG. 10(a).

Also, as described in the second embodiment, the composition result of low-level capacitances (1 to 2 pF) existing in the relays 54a to 54d and the capacitances 53a–53d is the actual sum of those capacitances. To select the exact capacitance, therefore, consideration has been given to allow a slightly larger value to be set as the value of each capacitance as in the second embodiment.

The capacitances between the print patterns on both sides of the printed circuit board can thus be designed and formed easily and selected precisely with little accuracy variation.

Figure 12:
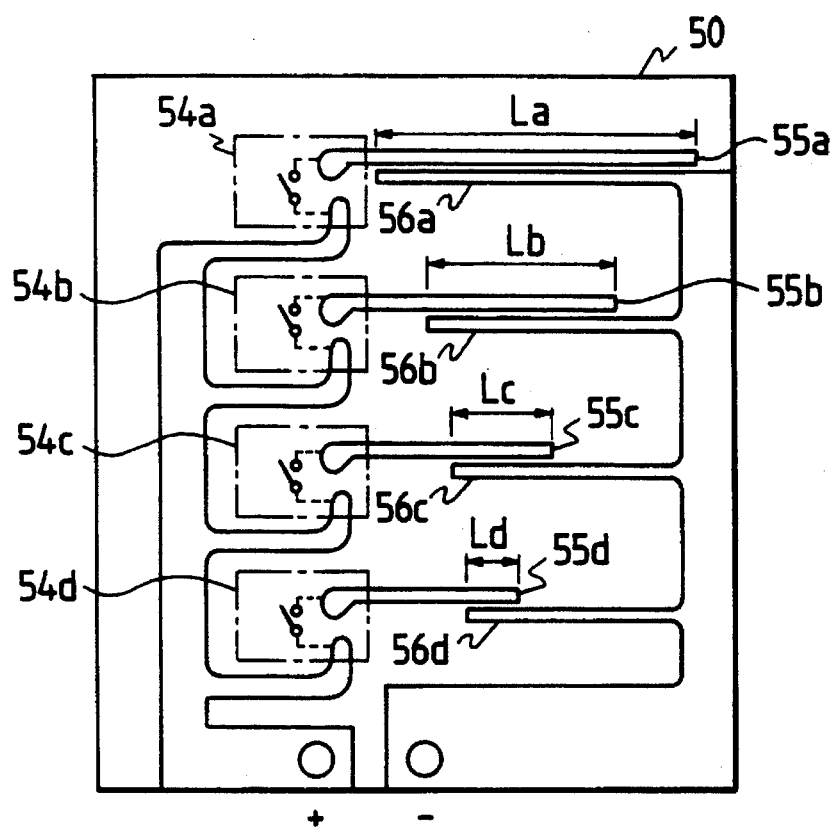
FIG. 12 illustrates an alternative arrangement example of the impedance matching circuit in the third embodiment of the present invention.

FIG. 12 shows an example wherein capacitances are formed by parallel print patterns as an alternative embodiment. In this arrangement, a plurality of capacitors of the impedance matching circuit 12 in an electrical discharge machine are constituted by patterns on a printed circuit board. In the drawing, 50 indicates a printed circuit board, 55a to 55d designate print patterns formed on the printed circuit board 50, 56a to 56d represent print patterns formed on the same side as the print patterns 55a to 55d and provided in parallel with the print patterns 55a to 55d to have different opposite lengths La to Ld from each other, and 54a to 54d denote relays connected to the print patterns 55a to 55d respectively.

Operation will now be described. When the relays 54a to 54d are closed by the matching circuit control means in the drawing, the capacitances are formed at the areas where the print patterns 51a to 51d and the print patterns 56a to 56d are opposed to each other. Any of 16 steps of capacitances can be chosen by switching between the relays 54a to 54d. The capacitance of each print pattern is determined by the distance between the print pattern 55 and the print pattern 56 and the opposing length La to Ld thereof. The opposing lengths of the patterns are preset so that the capacitances between the print patterns 55a to 55d and the print patterns 56a to 56d have geometric series values of which coefficient is approximately 2 to ensure that any of 16 different consecutive capacitance values can be chosen according to the combination of the four print patterns as shown in FIG. 10(a).

Also, as described in the second embodiment, the combined result of the low-level capacitances (1 to 2 pF) present in the relays 54a to 54d and the capacitances 53a–53d is the actual sum of those capacitances. To select the exact capacitance, therefore, consideration has been given to allow a slightly larger value to be set as the value of each capacitance as in the second embodiment.

The capacitances between the print patterns arranged in parallel on the printed circuit board can thus be designed and formed easily according to the opposing lengths of the print patterns and selected precisely with little accuracy variation, especially in a small capacitance area.

Figure 13:
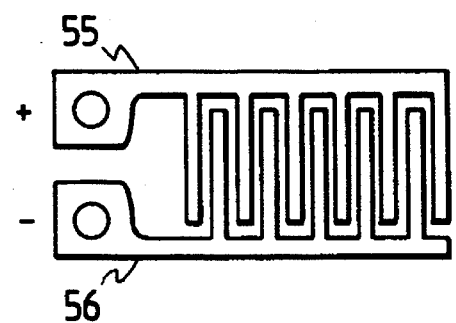
FIG. 13 illustrates a further alternative arrangement example of the impedance matching circuit in the third embodiment of the present invention.

Also, the patterns may be formed in a shape having a long opposing length as shown in FIG. 13 to form a larger capacitance in a smaller area.

It will be recognized that the capacitances formed by only the print patterns in the disclosed embodiment may be constituted by combinations of lumped capacitor devices and the print patterns.

Further, the example given for application to the impedance matching circuit of the electrical discharge machine in the previous embodiment may also be used as a variable capacitance apparatus for the matching circuit or the like of another high-frequency oscillator.

Figure 14:
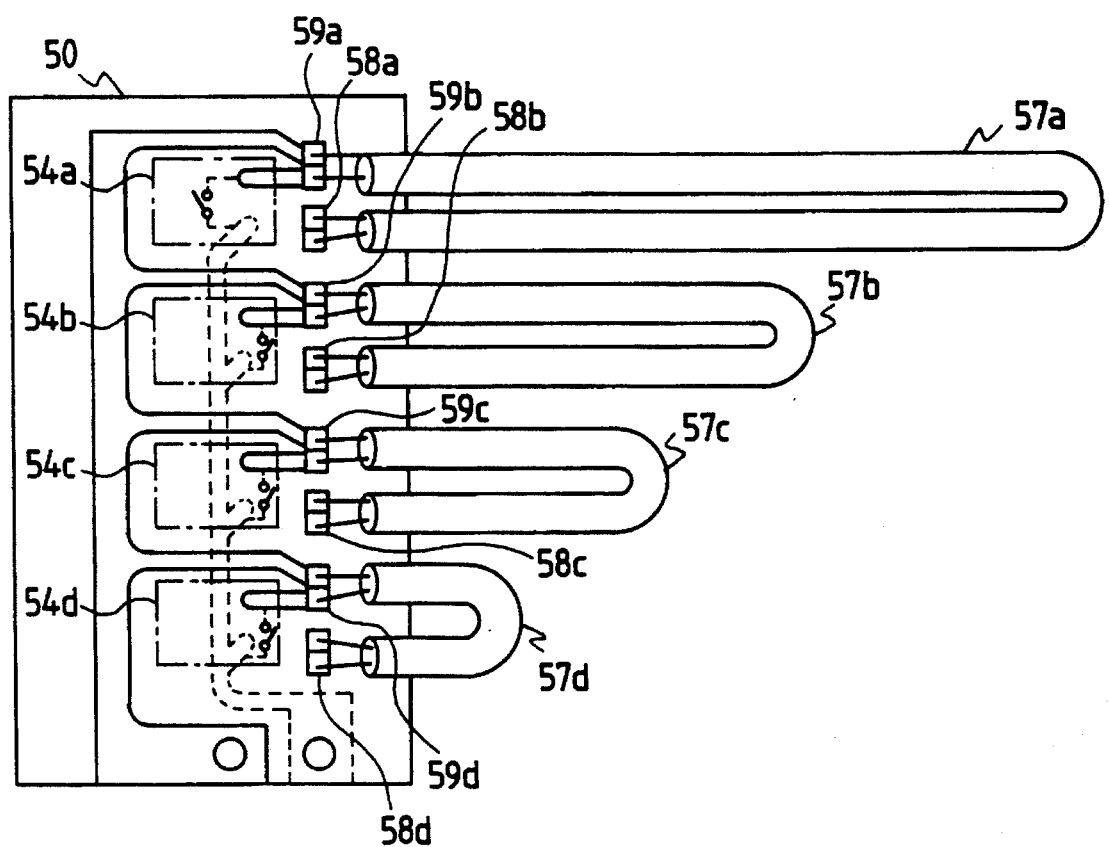
FIG. 14 illustrates an arrangement example of an impedance matching circuit in a fourth embodiment of the present invention.

The fourth embodiment of the present invention will now be described with reference to FIG. 14. FIG. 14 shows an embodiment wherein a plurality of capacitors in the impedance matching circuit 12 are formed by a plurality of cables different in capacitance. In this drawing, 50 indicates a printed circuit board, and 57a to 57d designate a plurality of coaxial cables which are connected via terminals on the printed circuit board 50, have different lengths from each other, and are connected at one end to dummy terminals 58a to 58d so as to be open. 54a to 54d represent relays connected to the coaxial cables 57a to 57d via terminals 59a to 59d respectively.

Operation is similar to that in the previous embodiment using the print patterns. When the relays 54a to 54d are closed by the matching circuit control unit 64, capacitances are formed at the coaxial cables 57a to 57d and any of 16 steps of capacitances can be chosen by switching between the relays 54a to 54d. The capacitance of each coaxial cable is determined by the cable length or cable type. The capacitances of the coaxial cables 57a to 57d are preset to have geometric series values of which coefficient is approximately 2 to ensure that any of 16 different consecutive capacitance values can be chosen according to the combination of the four coaxial cables.

Also as described in the second embodiment the combination of low-level capacitances (1 to 2 pF) existing in the relays 54a to 54d and the cable capacitances is the actual sum of capacitances. To select the exact capacitance therefore, consideration has been given to allow a slightly larger value to be set as the value of each capacitance as in the second embodiment.

The capacitances of the cables can thus be designed and formed easily according to the cable length and type, and are effective for a case where the capacitance must be fine-tuned according to machines.

It will be appreciated that the capacitances formed by only the cables in the previous embodiment may also be constituted by combinations of lumped capacitor devices and the cables.

Further, the example given for application to the impedance matching circuit of the electrical discharge machine in said embodiment may be also used as a variable capacitance apparatus for the matching circuit or the like of another high-frequency oscillator.

The fifth embodiment of the present invention will now be described with reference to FIGS. 15, 16(a), 16(b), 17 and 18.

Figure 15:
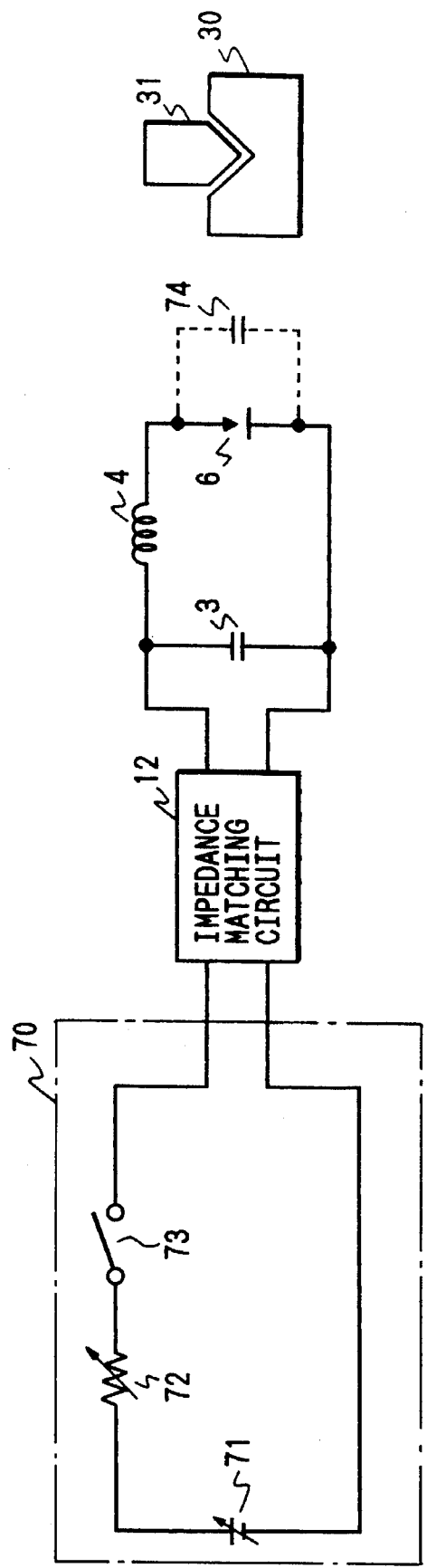
FIG. 15 illustrates a circuit arrangement in fifth and sixth embodiments of the present invention.
Figure 17:
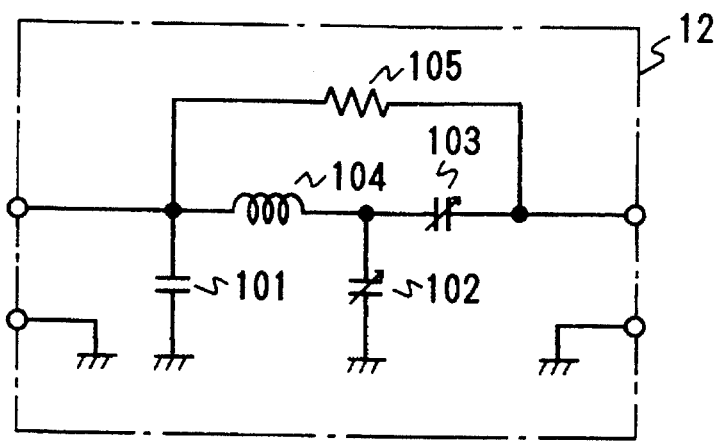
FIG. 17 illustrates an example of an impedance matching circuit in the fifth embodiment of the present invention.

FIG. 15 shows an example of an electrical discharge machine which machines a workpiece with the progress of impedance matching in an electrical discharge machine which uses a direct-current pulse for machining. In this drawing, 3 indicates a stray capacitance existing in feeder cables and the circuit, 4 designates a stray inductance existing in the feeder cables and a mechanical structure (e.g. feeding section), 6 denotes a machining gap formed by an electrode and a workpiece, 70 represents a direct-current pulse power supply which supplies a direct-current pulse voltage to the machining gap, 71 indicates a direct-current power supply, 72 represents a current limiting resistor, 73 designates a switching device, 12 denotes an impedance matching circuit, 74 indicates a machining gap capacitance formed between the electrode and the workpiece, 30 designates a workpiece, and 31 denotes an electrode. FIG. 17 shows the impedance matching circuit in the present embodiment, wherein a resistor 105 is added in parallel with a π-type circuit consisting of a capacitor 101, variable capacitors 102, 103, and a coil 104.

Figure 16A:
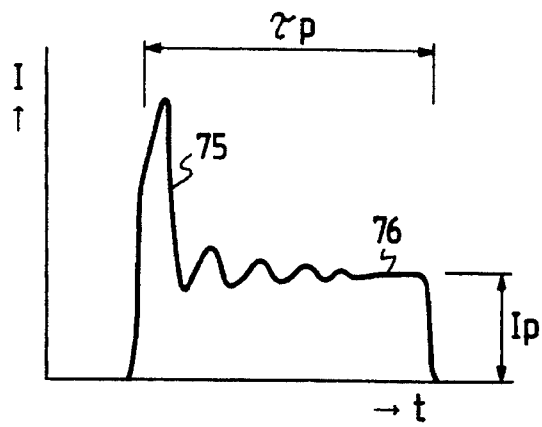
FIGS. 16(a)–16(c) illustrate current waveforms in the fifth and sixth embodiments of the present invention.

In operation, at first, the direct-current pulse power supply 70 turns the switching device 73 on/off to apply a voltage determined by the voltage of the direct-current power supply 71 to the machining gap 6 for machining. Namely, when the switching device 73 is turned on, the voltage is applied to the machining gap via the current limiting resistor 72 and the resistor 105. When a discharge takes place in the machining gap 6, the switching device 73 is kept on for a given period of time to supply a current pulse of given pulse width to the machining gap for machining. FIG. 16(a) shows a current waveform generated by the conventional direct-current pulse power supply, wherein the current pulse of pulse width equivalent to time (τp) when the switching device 73 is n is supplied. This current pulse, which consists of a capacitor discharge portion 75 occurring when the capacitance present in the machining gap is discharged and a direct-current arc discharge portion 76 (crest value Ip) determined by the current limiting resistor 72, the resistor 105 and the voltage of the direct-current power supply 71. It has a waveform where the initial capacitor discharge portion 75 is followed by the direct-current arc discharge portion 76. In die-sinking electrical discharge machining wherein the capacitance formed between the electrode and the workpiece is large, the peak value of the capacitor discharge portion 75 may be considerably larger than the crest value Ip of the direct-current arc discharge portion 76, and particularly in finishing, it is known that a machined surface is deteriorated significantly.

Figure 16B:
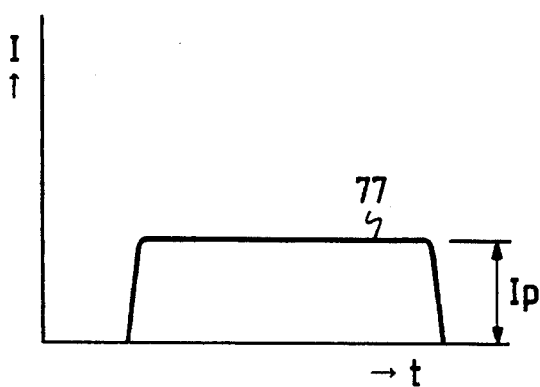

Meanwhile, the variable capacitors 102, 103 in the impedance matching circuit 12 are adjusted to render the whole circuit inductive, thereby providing a current waveform 77 which does not have the capacitor discharge portion 75 as shown in FIG. 16(b). Relatively resembling a square wave and not having the capacitor discharge portion 75 high in peak, this current waveform provides a machine surface of good quality, particularly in die-sinking electrical discharge machining or the like using oil as dielectric, and has a characteristic that the electrode consumption is reduced sharply. Also, this current pulse provides a machined surface of high quality when the capacitance in the machining gap is large.

It is to be understood that the π-type circuit as shown in FIG. 17, which produces an effect as a low-pass filter, has a characteristic suitable for providing the waveform as in FIG. 16(b). Also, any of the capacitance switching type impedance matching circuits as shown in FIGS. 9 to 14 employed as the impedance matching circuit as in FIG. 17 facilitates the adjustment of the low-level capacitance required for the impedance matching of the electrical discharge machine.

Figure 18:
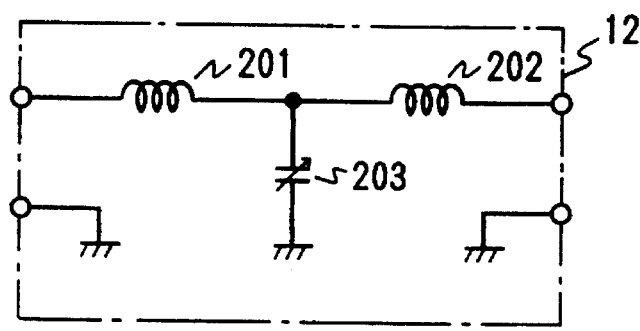
FIG. 18 illustrates an alternative example of the impedance matching circuit in the fifth embodiment of the present invention.

It will be appreciated that a circuit which is made up of coils 201, 202 connected in series and a variable capacitor 203 connected to the connection point of the coils 201, 202 as shown in FIG. 18 may be used as the impedance matching circuit 12 in the present embodiment.

The sixth embodiment of the present invention will now be described with reference to FIGS. 15, 16(a), 16(c) and 19.

Figure 19:
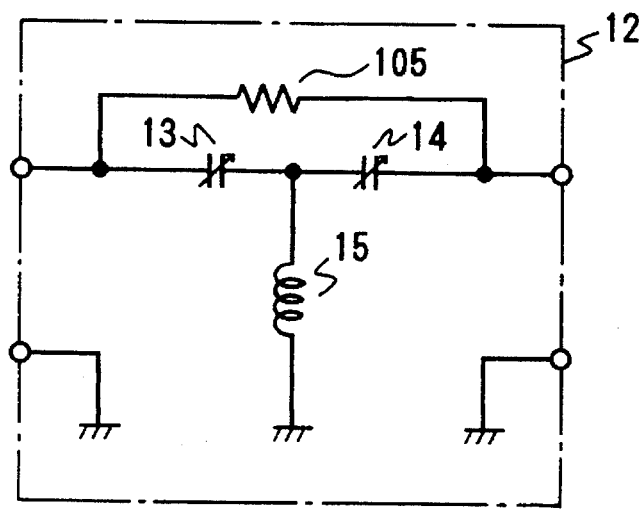
FIG. 19 illustrates an example of an impedance matching circuit in the sixth embodiment of the present invention.

FIG. 19 shows a specific circuit used as the impedance matching circuit in FIG. 15, wherein the resistor 105 is added to a T-type circuit consisting of the capacitor 13, the variable capacitor 14 and the coil 15. It is to be understood that other parts are identical to those in the fifth embodiment.

Operation will now be described in accordance with FIGS. 15, 16(a), 16(c) and 19. As in the fifth embodiment, the direct-current pulse power supply 70 turns the switching device 73 on/off to apply a voltage determined by the voltage of the direct-current power supply 71 to the machining gap 6 for machining. Namely, when the switching device 73 is turned on, the voltage is applied to the machining gap via the current limiting resistor 72 and the resistor 105. When a discharge takes place in the machining gap 6, the switching device 73 is kept on for a given period of time to supply a current pulse of given pulse width to the machining gap for machining.

Figure 16C:
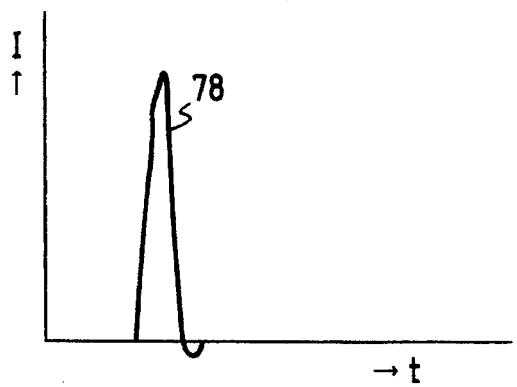

In the present embodiment, the impedance matching circuit 12 is tuned to have a characteristic opposite to that in the fifth embodiment in order to render the whole circuit capacitive, whereby the discharge is deignited after the capacitor discharge portion 75 to shut off the discharge arc so that a current waveform 78 having no direct-current arc discharge portion 76 as shown in FIG. 16(c) is generated for machining. This waveform provides a machined surface of good quality particularly in wirecut electrical discharge machining using water as dielectric and in the machining of materials, e.g. carbide materials, which are likely to result in faults, such as crack, when the pulse width increases.

It is to be understood that the T-type circuit as shown in FIG. 19, which produces an effect as a high-pass filter, has a characteristic suitable for providing the waveform as in FIG. 16(c). Also, any of the capacitance switching type impedance matching circuits as shown in FIGS. 9 to 14 employed as the impedance matching circuit as in FIG. 19 ensures ease of adjusting the low-level capacitance required for the impedance matching of the electrical discharge machine.

Embodiment 7 of the present invention will now be described with reference to FIGS. 20, 21(a) and 21(b).

Figure 20:
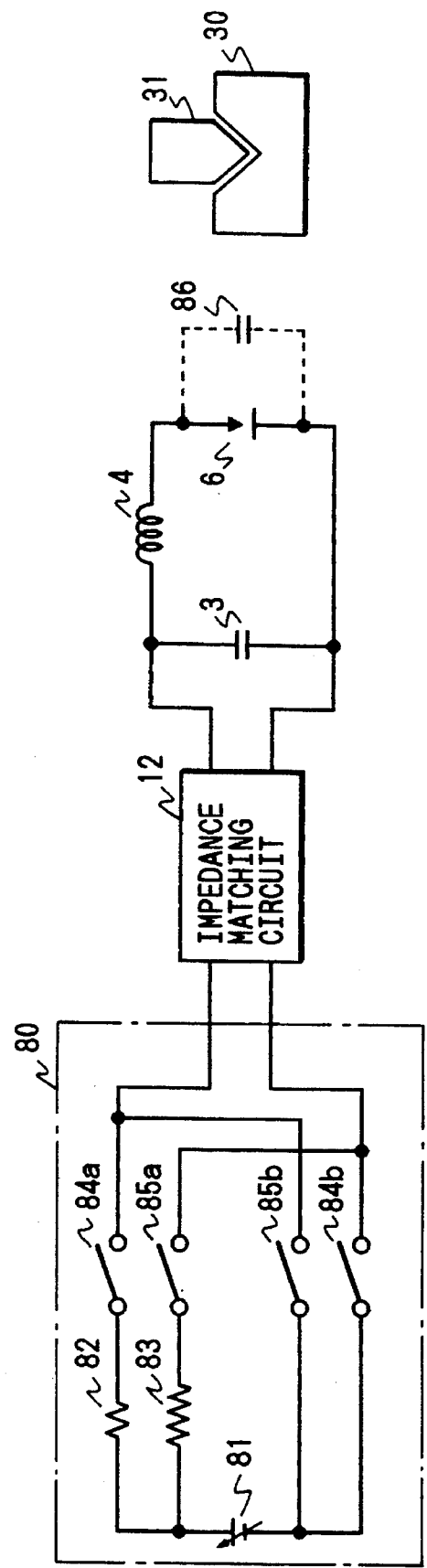
FIG. 20 illustrates a circuit arrangement for the seventh and eighth embodiments of the present invention.

FIG. 20 shows an example of an electrical discharge machine which machines a workpiece with the progress of impedance matching in an electrical discharge machine which uses a bipolar pulse for machining. Use of a bipolar pulse for machining has such features that machining speed is improved in oil-immersed machining and the electrolytic corrosion of the workpiece can be prevented in water-immersed machining. In this drawing, 3 indicates a stray capacitance existing in feeder cables and the circuit, 4 designates a stray inductance existing in the feeder cables and a mechanical structure (e.g. feeding section), 6 denotes a machining gap formed by an electrode and a workpiece, 80 represents a bipolar pulse power supply which supplies a bipolar pulse voltage to the machining gap, 81 indicates a direct-current power supply, 82 and 83 represent current limiting resistors which determine a current value at the corresponding polarity, 84a and 84b designate switching devices for supplying a positive-polarity pulse current, 85a and 85b denote switching devices for supplying a negative-polarity pulse current, 12 indicates an impedance matching circuit, 86 represents a machining gap capacitance formed between the electrode and the workpiece, 30 designates a workpiece, and 31 denotes an electrode. The impedance matching circuit 12 used herein is the π-type circuit shown in FIG. 17. Operation will now be described.

First, the bipolar pulse power supply 80 turns on/off the switching devices 84a, 84b and the switching devices 85a, 85b alternately to apply a bipolar voltage determined by the voltage of the direct-current power supply 81 to the machining gap 6 for machining. When a positive-polarity discharge occurs in the machining gap 6, the switching devices 84a, 84b are kept on for a given length of time to supply a current pulse of given pulse width to the machining gap for machining. After the switching devices 84a, 84b are turned off to terminate the positive-polarity discharge, the switching devices 85a, 85b are turned on to apply a voltage to the opposite-polarity side, and after the discharge is generated, said devices are kept on for a predetermined period of time to supply the current pulse.

Figure 21A:
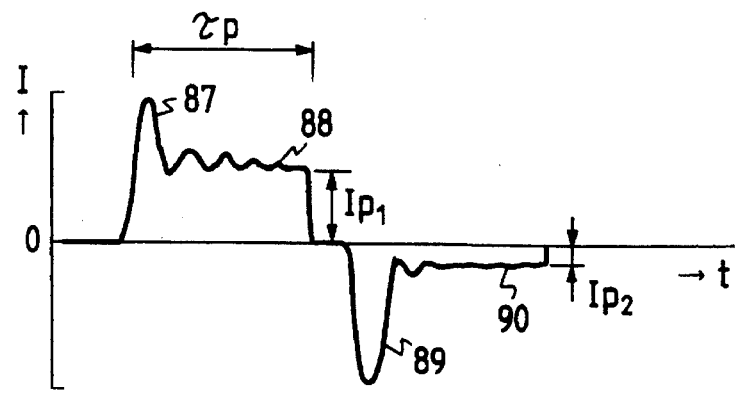
FIGS. 21(a)–21(c) illustrate current waveforms in the seventh and eighth embodiments of the present invention.

FIG. 21(a) shows a current waveform generated by the conventional bipolar pulse power supply, wherein a positive-polarity current pulse having a pulse width equivalent to time (τp) when the switching devices 84a, 84b are on is supplied. This current pulse, which consists of a capacitor discharge portion 87 generated when the capacitance present in the machining gap is discharged and a direct-current arc discharge portion 88 (crest value Ip1) determined by the current limiting resistor 82, the resistor 105 and the voltage of the direct-current power supply 81, has a waveform where the initial capacitor discharge portion 87 is followed by the direct-current arc discharge portion 88. Then, in the opposite-polarity discharge, an opposite-polarity current pulse of pulse width equivalent to time when the switching devices 85a, 85b are on is supplied similarly. This current pulse also consists of a capacitor discharge portion 89 occurring when the capacitance existing in the machining gap is discharged and a direct-current arc discharge portion 90 (crest value Ip2) determined by the current limiting resistor 83 and the voltage of the direct-current power supply 81. However, since the value of the current limiting resistor 83 is larger than that of the current limiting resistor 82, the crest value Ip2 of the direct-current arc discharge portion 89 is much smaller than the crest value Ip1 of the positive-polarity, direct-current arc discharge portion 88.

As in the fifth embodiment in die-sinking electrical discharge machining wherein the capacitance formed between the electrode and the workpiece is large, the peak value of the capacitor discharge portion 87 may be considerably larger than the crest value Ip of the direct-current arc discharge portion 88, and a machined surface is deteriorated significantly, especially in finishing.

Figure 21B:
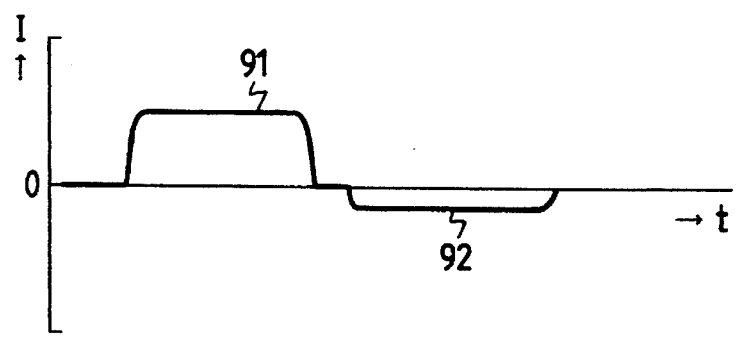

In the meantime, the variable capacitors 102, 103 in the impedance matching circuit 12 are adjusted to render the whole circuit inductive, thereby providing a current waveform 91 which does not have the capacitor discharge portion 87 as shown in FIG. 21(b) as the positive-polarity current pulse. Relatively resembling a square wave and not having the capacitor discharge portion 87 high in peak, this current waveform provides a machined surface of good quality particularly in die-sinking electrical discharge machining or the like using oil as dielectric and has a characteristic that the electrode consumption is reduced sharply. Also this current pulse provides a machined surface of high quality when the capacitance in the machining gap is large.

Whereas strict impedance matching cannot be performed on both polarities in said bipolar machining because of a difference between the positive- and opposite-polarity output impedances of the power supply, making impedance matching on the polarity side contributing to machining (the positive-polarity side in the present invention) will provide a machining characteristic which does not pose any problem practically.

It is to be understood that as in the fifth embodiment, the π-type circuit as shown in FIG. 17, which produces an effect as a low-pass filter, has a characteristic suitable for providing the waveform as in FIG. 21(b). Also, any of the capacitance switching type impedance matching circuits as shown in FIGS. 9 to 14 employed as the impedance matching circuit as in FIG. 17 facilitates the adjustment of the low-level capacitance required for the impedance matching of the electrical discharge machine.

The eighth embodiment of the present invention will now be described in accordance with FIGS. 19, 20, 21(a) and 21(c). It is to be understood that this embodiment is only different from Embodiment 7 in arrangement in that the T-type circuit shown in FIG. 19 is employed as the impedance matching circuit in FIG. 20.

As in Embodiment 7, the bipolar pulse power supply 80 turns on/off the switching devices 84a, 84b and the switching devices 85a, 85b alternately to apply a bipolar voltage determined by the voltage of the direct-current power supply 81 to the machining gap 6 for machining. When a positive-polarity discharge occurs in the machining gap 6, the switching devices 84a, 84b are kept on for a given length of time to supply a current pulse of given pulse width to the machining gap for machining. After the switching devices 84a, 84b are turned off to terminate the positive-polarity discharge, the switching devices 85a, 85b are turned on to apply a voltage to the opposite-polarity side, and after the discharge is generated, said devices are kept on for a predetermined period of time to supply the current pulse.

Figure 21C:
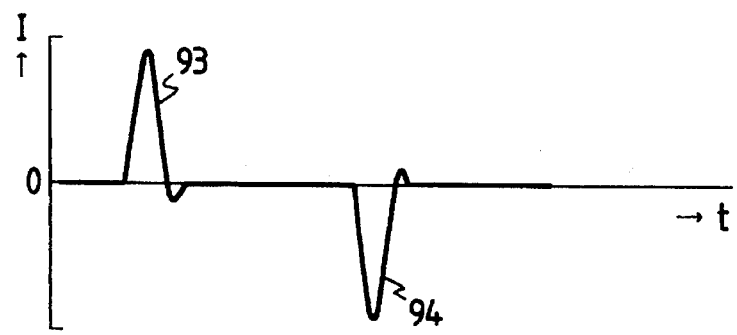

In the present embodiment, the impedance matching circuit 12 is tuned to have a characteristic opposite to that in Embodiment 7 to make the whole circuit capacitive, whereby the discharge is deignited after the capacitor discharge portion 87 to shut off the discharge arc so that a current waveform 93 having no direct-current arc discharge portion 88 as shown in FIG. 21(c) is generated for machining. This waveform provides a machined surface of good quality particularly in wirecut electrical discharge machining using water as dielectric and in the machining of materials, e.g. carbide materials, which are likely to result in faults, such as crack, when the pulse width increases.

Whereas strict impedance matching cannot be conducted on both polarities in said bipolar machining, as in the seventh embodiment, because of a difference between the positive- and opposite-polarity output impedances of the power supply, performing impedance matching on the polarity side contributing to machining (the positive-polarity side in the present invention) will provide a machining characteristic which does not pose any problem practically.

As in the sixth embodiment, the T-type circuit as shown in FIG. 19, which produces an effect as a high-pass filter, has a characteristic suitable for providing the waveform as in FIG. 21(c). Also, any of the capacitance switching type impedance matching circuits as shown in FIGS. 9 to 14 employed as the impedance matching circuit as in FIG. 19 facilitates the adjustment of the low-level capacitance required for the impedance matching of the electrical discharge machine.

Figure 22:
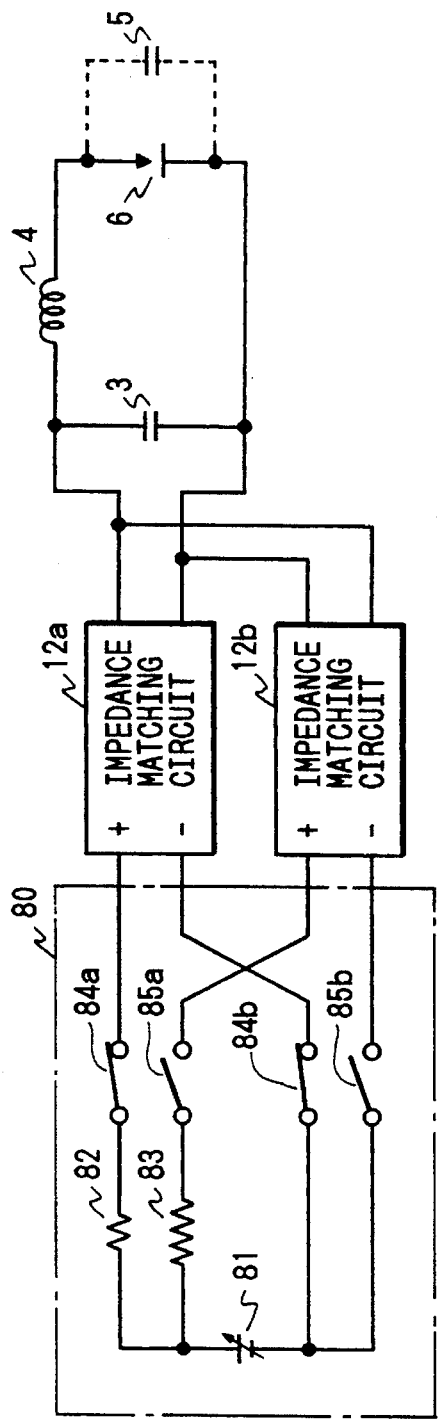
FIG. 22 illustrates an alternative circuit arrangement in the seventh and eighth embodiments of the present invention.

While the example of making impedance matching only on one polarity was given in the seventh and eighth embodiments, a more excellent machining characteristic will be obtained by providing impedance matching circuits 12a, 12b for both polarities independently as in FIG. 22 to make impedance matching on both polarities strictly.

Figure 23:
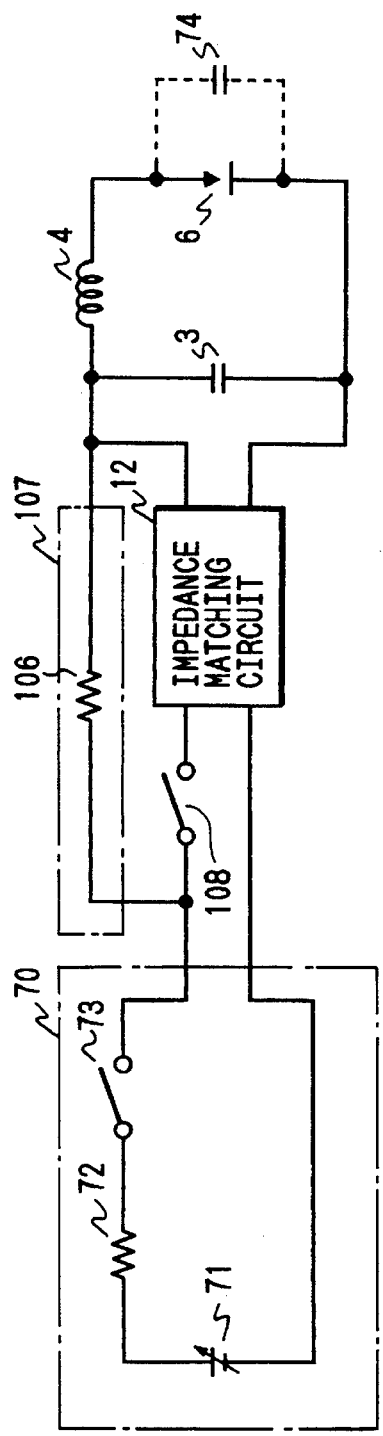
FIG. 23 illustrates a circuit arrangement in the ninth embodiment of the present invention.

The ninth embodiment of the present invention will now be described with reference to FIGS. 23 and 16(b). FIG. 23 shows an example of an electrical discharge machine which machines a workpiece with the progress of impedance matching in an electrical discharge machine which uses a direct-current pulse for machining. In this drawing, 3 indicates a stray capacitance existing in feeder cables and the circuit, 4 designates a stray inductance existing in the feeder cables and a mechanical structure (e.g. feeding section), 6 denotes a machining gap formed by an electrode and a workpiece, 70 represents a direct-current pulse power supply which supplies a direct-current pulse voltage to the machining gap, 71 indicates a direct-current power supply, 72 represents a current limiting resistor, 73 designates a switching device, 12 denotes an impedance matching circuit, 74 indicates a machining gap capacitance formed between the electrode and the workpiece, 106 represents a resistor, 107 denotes a bypass circuit provided in parallel with the impedance matching circuit 12, and 108 designates a switching device disposed in series with the impedance matching circuit 12. The circuit used as the impedance matching circuit is, for example, the one in FIG. 9.

As in the fifth embodiment, the direct-current pulse power supply 70 turns the switching device 73 on/off to apply a voltage determined by the voltage of the direct-current power supply 71 to the machining gap 6 for machining. Namely, when the switching device 73 is turned on, the voltage is applied to the machining gap via the current limiting resistor 72 and the resistor 106. When a discharge takes place in the machining gap 6, the switching device 73 is kept on for a given period of time to supply a current pulse of given pulse width to the machining gap for machining. Then, the discharge generated in the machining gap is detected by discharge detecting means (not shown) and the switching device 108 is turned off on, or a given period time after, the occurrence of the discharge to disconnect the impedance matching circuit 12 from the machining gap. Subsequently, when a given length of stop time has elapsed after the end of the discharge, the switching device 108 is turned on again and the switching device 73 is turned on to apply a voltage for a next discharge.

Prior to machining, the impedance matching circuit 12 switches and tunes the variable capacitors 41a to 41d to render the whole circuit inductive, whereby the capacitor discharge portion 75 can be removed at discharge occurrence as shown in FIG. 16(b). Further, by disconnecting the impedance matching circuit 12 from the machining gap immediately after the discharge as described above, the subsequent direct-current arc can be maintained stably.

Relatively resembling a square wave and not having the capacitor discharge portion 75 high in peak, this current waveform provides a machined surface of good quality particularly in die-sinking electrical discharge machining or the like using oil as dielectric and also has a characteristic that the electrode consumption is reduced sharply. Also, this current pulse provides a machined surface of high quality when the capacitance in the machining gap is large.

Figure 24:
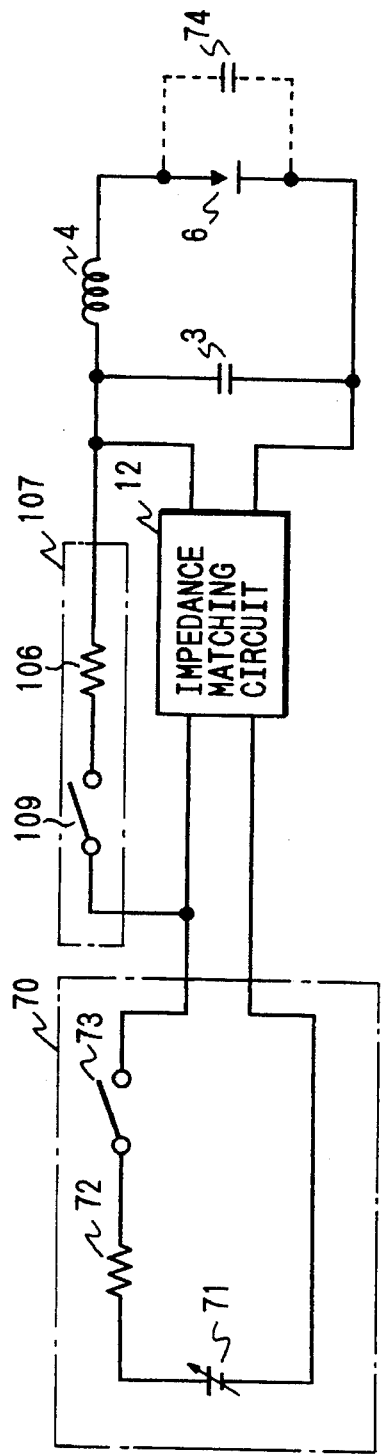
FIG. 24 illustrates a circuit arrangement in the tenth embodiment of the present invention.

The tenth embodiment of the present invention will now be described with reference to FIGS. 24 and 16(c). FIG. 24 shows an example of an electrical discharge machine which machines a workpiece with the progress of impedance matching in an electrical discharge machine which uses a direct-current pulse for machining. In this drawing, 3 indicates a stray capacitance existing in feeder cables and the circuit, 4 designates a stray inductance existing in the feeder cables and a mechanical structure (e.g. feeding section), 6 denotes a machining gap formed by an electrode and a workpiece, 70 represents a direct-current pulse power supply which supplies a direct-current pulse voltage to the machining gap, 71 indicates a direct-current power supply, 72 represents a current limiting resistor, 73 designates a switching device, 12 denotes an impedance matching circuit, 74 indicates a machining gap capacitance formed between the electrode and the workpiece, 106 represents a resistor, 109 designates a switching device provided in series with the resistor 106, and 107 denotes a bypass circuit consisting of the resistor 106 and the switching device 109 and disposed in parallel with the impedance matching circuit 12. The circuit used as the impedance matching circuit is, for example, the one in FIG. 9.

As in the sixth embodiment, the direct-current pulse power supply 70 turns the switching device 73 on/off to apply a voltage determined by the voltage of the direct-current power supply 71 to the machining gap 6 for machining. Namely, when the switching device 73 is turned on, the voltage is applied to the machining gap via the current limiting resistor 72 and the resistor 106. When a discharge takes place in the machining gap 6, the switching device 73 is kept on for a given period of time to supply a current pulse of given pulse width to the machining gap for machining. Then, the discharge generated in the machining gap is detected by discharge detecting means (not shown) and the switching device 109 is turned off on, or a predetermined period time after, the occurrence of the discharge to shut off the bypass circuit 107. Subsequently, when a given length of stop time has elapsed after the end of the discharge, the switching device 109 is turned on again and the switching device 73 is turned on to apply a voltage for a next discharge.

In the present embodiment, prior to machining, the variable capacitors 41a to 41d are switched and tuned to adjust the impedance matching circuit 12 to a characteristic opposite to that in the ninth embodiment to render the whole circuit capacitive, whereby the discharge is deignited after the capacitor discharge portion 75 to shut off the discharge arc so that the current waveform 78 without the direct-current arc discharge portion 76 as shown in FIG. 16(c) is generated for machining. Further, by disconnecting the bypass circuit 107 from the machining gap immediately after the discharge as described above, the subsequent direct-current arc after the capacitor discharge portion 75 can be eliminated completely.

This current waveform provides a machined surface of good quality particularly in wirecut electrical discharge machining using water as dielectric and in the machining of materials, e.g. carbide materials, which are likely to result in faults, such as crack, when the pulse width increases.

The eleventh embodiment of the present invention will now be described with reference to FIGS. 25 and 21(b).

Figure 25:
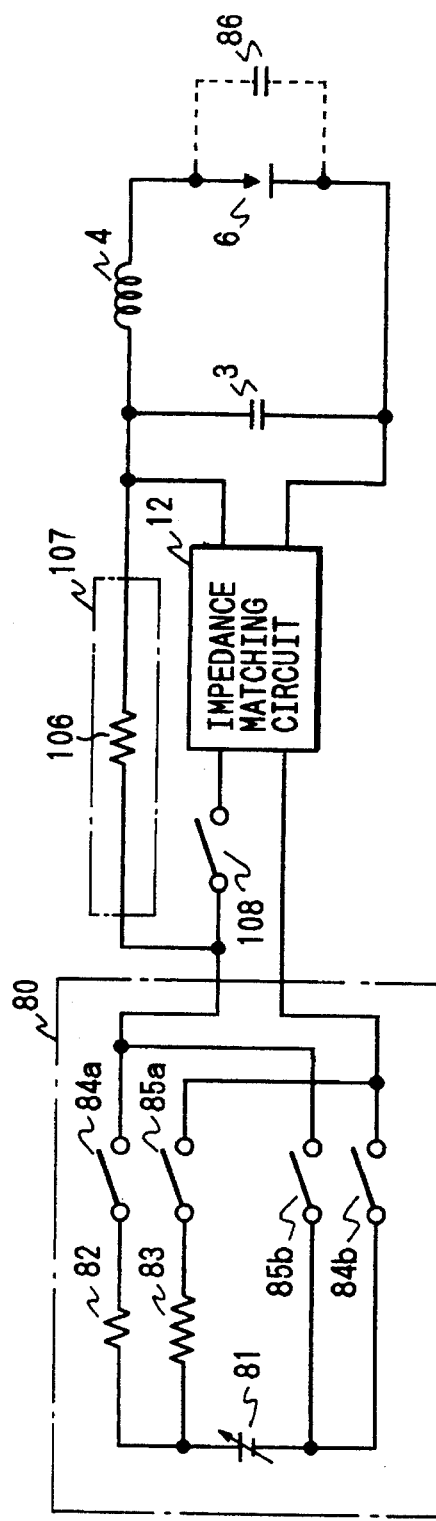
FIG. 25 illustrates a circuit arrangement in the eleventh embodiment of the present invention.

FIG. 25 shows an example of an electrical discharge machine which machines a workpiece with the progress of impedance matching in an electrical discharge machine which uses a bipolar pulse for machining. As described in the seventh embodiment, use of a bipolar pulse for machining has such features that machining speed is improved in oil-immersed machining and the electrolytic corrosion of the workpiece can be prevented in water-immersed machining. In this drawing, 3 indicates a stray capacitance existing in feeder cables and the circuit, 4 designates a stray inductance existing in the feeder cables and a mechanical structure (e.g. feeding section), 6 denotes a machining gap formed by an electrode and a workpiece, 80 represents a bipolar pulse power supply which supplies a bipolar pulse voltage to the machining gap, 81 indicates a direct-current power supply, 82 and 83 represent current limiting resistors which determine current values at the corresponding polarity, 84a and 84b designate switching devices for supplying a positive-polarity pulse current, 85a and 85b denote switching devices for supplying a negative-polarity pulse current, 12 indicates an impedance matching circuit, 108 represents a switching device connected in series with the impedance matching circuit 12, 106 designates a resistor, and 107 denotes a bypass circuit provided in parallel with the impedance matching circuit 12. 86 represents a machining gap capacitance formed between the electrode and the workpiece, 30 indicates a workpiece, and 31 denotes an electrode. The impedance matching circuit 12 used herein is, for example, the one as in FIG. 9.

In operation, as in Embodiment 7, the bipolar pulse power supply 80 turns on/off the switching devices 84a, 84b and the switching devices 85a, 85b alternately to apply a bipolar voltage determined by the voltage of the direct-current power supply 81 to the machining gap 6 for machining. When a positive-polarity discharge occurs in the machining gap 6, the switching devices 84a, 84b are kept on for a given length of time to supply a current pulse of given pulse width to the machining gap for machining. After the switching devices 84a, 84b are turned off to terminate the positive-polarity discharge, the switching devices 85a, 85b are turned on to apply a voltage to the opposite-polarity side, and after the discharge is generated, said devices are kept on for a predetermined period of time to supply the current pulse. Then, the discharge generated in the machining gap is detected by discharge detecting means (not shown) and the switching device 108 is turned off, at or a given period time after, the occurrence of the discharge to disconnect the impedance matching circuit 12 from the machining gap. Subsequently, when a given length of stop time has elapsed after the end of the discharge, the switching device 108 is turned on again and the switching device 73 is turned on to apply a voltage for a next discharge.

Prior to machining, the impedance matching circuit 12 switches between and tunes the variable capacitors 41a to 41d to make the whole circuit inductive, whereby the capacitor discharge portion 87 can be removed at positive-polarity discharge occurrence as shown in FIG. 21(b). Further, by disconnecting the impedance matching circuit 12 from the machining gap immediately after the discharge as described above, the subsequent direct-current arc can be maintained stably.

Relatively resembling a square wave and not having the capacitor discharge portion 87 high in peak, this current waveform provides a machined surface of good quality particularly in die-sinking electrical discharge machining or the like using oil as dielectric and also has a characteristic that the electrode consumption is reduced sharply. Also, this current pulse provides a machined surface of high quality when the capacitance in the machining gap is large.

Whereas strict impedance matching cannot be made on both polarities in said bipolar machining because of a difference between the positive- and opposite-polarity output impedances of the power supply, making impedance matching on the polarity side contributing to machining (the positive-polarity side in the present invention) will provide a machining characteristic which does not pose any problem practically.

The twelfth embodiment of the present invention will now be described with reference to FIGS. 26 and 21(c).

Figure 26:
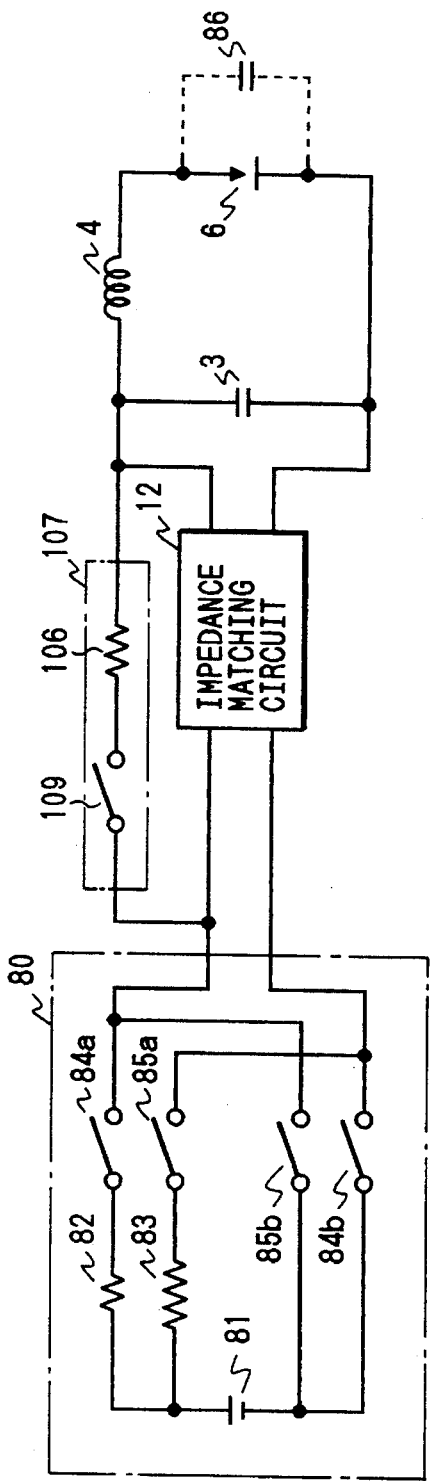
FIG. 26 illustrates a circuit arrangement in the twelfth embodiment of the present invention.

FIG. 26 shows an example of an electrical discharge machine which machines a workpiece with the progress of impedance matching in an electrical discharge machine which uses a bipolar pulse for machining. In this drawing, 3 indicates a stray capacitance existing in feeder cables and the circuit, 4 designates a stray inductance existing in the feeder cables and a mechanical structure (e.g. feeding section), 6 denotes a machining gap formed by an electrode and a workpiece, 80 represents a bipolar pulse power supply which supplies a bipolar pulse voltage to the machining gap, 81 indicates a direct-current power supply, 82 and 83 represent current limiting resistors which determine current values at the corresponding polarity, 84a and 84b designate switching devices for supplying a positive-polarity pulse current, 85a and 85b denote switching devices for supplying a negative-polarity pulse current, 12 indicates an impedance matching circuit, 106 designates a resistor, 109 represents a switching device connected in series with the resistor 106, 107 denotes a bypass circuit provided in parallel with the impedance matching circuit 12, 86 indicates a machining gap capacitance formed between the electrode and the workpiece, 30 designates a workpiece, and 31 denotes an electrode. The impedance matching circuit 12 used herein is, for example, the one as in FIG. 9.

As in the eleventh embodiment, the bipolar pulse power supply 80 turns on/off the switching devices 84a, 84b and the switching devices 85a, 85b alternately to apply a bipolar voltage determined by the voltage of the direct-current power supply 81 to the machining gap 6 for machining. When a positive-polarity discharge occurs in the machining gap 6, the switching devices 84a, 84b are kept on for a given length of time to supply a current pulse of given pulse width to the machining gap for machining. After the switching devices 84a, 84b are turned off to terminate the positive-polarity discharge, the switching devices 85a, 85b are turned on to apply a voltage to the opposite-polarity side, and after the discharge is generated, said devices are kept on for a predetermined period of time to supply the current pulse. The discharge generated in the machining gap is detected by discharge detecting means (not shown) and the switching device 109 is turned off on, or a given period time after, the occurrence of the discharge to shut off the bypass circuit 107. Subsequently, when a given length of stop time has elapsed after the end of the discharge, the switching device 109 is turned on again and the switching device 73 is turned on to apply a voltage for a next discharge.

In the present embodiment, the impedance matching circuit 12 is tuned to have a characteristic opposite to that in the eleventh embodiment to make the whole circuit capacitive, whereby the discharge is deignited after the capacitor discharge portion 87 to shut off the discharge arc so that a current waveform 93 having no direct-current arc discharge portion 88 as shown in FIG. 21(c) is generated for machining. Further, by disconnecting the bypass circuit 107 from the machining gap immediately after the discharge as described above, the subsequent direct-current arc after the capacitor discharge portion 75 can be eliminated completely.

This waveform provides a machined surface of good quality particularly in wirecut electrical discharge machining using water as dielectric and in the machining of materials, e.g. carbide materials, which are likely to result in faults, such as crack, when the pulse width increases.

Whereas strict impedance matching cannot be conducted on both polarities in said bipolar machining, as in the eighth embodiment, because of a difference between the positive- and opposite-polarity output impedances of the power supply, making impedance matching on the polarity side contributing to machining (the positive-polarity side in the present invention) will provide a machining characteristic which does not pose any problem practically.

While the example of making impedance matching only on one polarity was given in the previous two embodiments, a more excellent machining characteristic will be obtained by providing the impedance matching circuits 12a, 12b for both polarities independently as in FIG. 22 to make impedance matching on both polarities strictly.

Embodiment 13 of the present invention will now be described with reference to FIG. 27.

Figure 27:
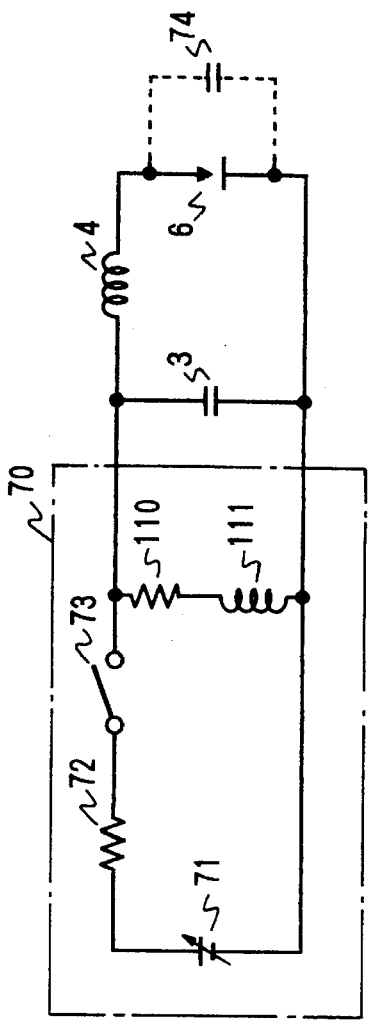
FIG. 27 illustrates a circuit arrangement in the thirteenth embodiment of the present invention.

FIG. 27 shows an example of an electrical discharge machine wherein a series circuit of a resistor and a coil is inserted in parallel with a machining gap in an electrical discharge machine which uses a direct-current pulse for machining. In this drawing, 3 indicates a stray capacitance existing in feeder cables and the circuit, 4 designates a stray inductance existing in the feeder cables and a mechanical structure (e.g. feeding section), 6 denotes a machining gap formed by an electrode and a workpiece, 70 represents a direct-current pulse power supply which supplies a direct-current pulse voltage to the machining gap, 71 indicates a direct-current power supply, 72 represents a current limiting resistor, 73 designates a switching device, 110 denotes a resistor, 111 indicates a coil, 74 denotes a machining gap capacitance formed between the electrode and the workpiece, 30 represents a workpiece, and 31 designates an electrode.

First, the direct-current pulse power supply 70 turns the switching device 73 on/off to apply a voltage determined by the voltage of the direct-current power supply 71 to the machining gap 6 for machining. Namely, when the switching device 73 is turned on, the voltage is applied to the machining gap via the current limiting resistor 72. When a discharge takes place in the machining gap 6, the switching device 73 is kept on for a given period of time and is then turned off to supply a current pulse of given pulse width to the machining gap for machining.

After the discharge occurrence, the capacitor discharge current 75 flows in the machining gap. However, since high-frequency oscillation components generated after the first half-wave of the capacitor discharge current are absorbed by the inductance of the coil 111 connected in parallel with the machining gap, the workpiece is machined with only the first half-wave of the capacitor discharge current which does not have the direct-current arc portion. Such a circuit has a special effect when the switching device 73 is turned on for a short time of about 0.5 to 1 μ sec for machining.

As in the sixth embodiment, this current waveform provides a machined surface of good quality particularly in wirecut electrical discharge machining using water as dielectric and in the machining of materials, e.g. carbide materials, which are likely to result in faults, such as crack, when the pulse width increases.

Figure 28:
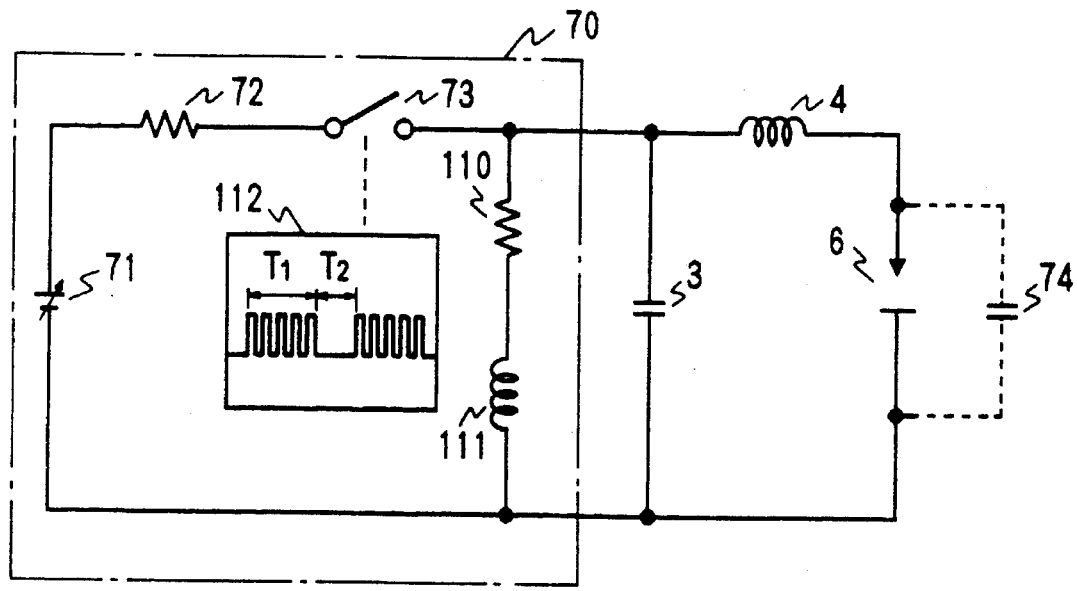
FIG. 28 illustrates a circuit arrangement in the Embodiment 14 of the present invention.

The fourteenth embodiment of the present invention will now be described with reference to FIG. 28. FIG. 28 shows an example of an electrical discharge machine wherein a series circuit of a resistor and a coil is inserted in parallel with a machining gap in an electrical discharge machine which uses a direct-current pulse for machining. In this drawing, 3 indicates a stray capacitance existing in feeder cables and the circuit, 4 designates a stray inductance existing in the feeder cables and a mechanical structure (e.g. feeding section), 6 denotes a machining gap formed by an electrode and a workpiece, 70 represents a direct-current pulse power supply which supplies a direct-current pulse voltage to the machining gap, 71 indicates a direct-current power supply, 72 represents a current limiting resistor, 73 designates a switching device, 110 denotes a resistor, 111 indicates a coil, 112 designates driving means for switching the switching device 73 at high frequency, 74 denotes a machining gap capacitance formed between the electrode and the workpiece, 30 represents a workpiece, and 31 indicates an electrode. Operation will now be described.

As in Embodiment 13, the direct-current pulse power supply 70 turns the switching device 73 on/off to apply a voltage determined by the voltage of the direct-current power supply 71 to the machining gap 6 for machining. Namely, when the switching device 73 is turned on, the voltage is applied to the machining gap via the current limiting resistor 72 and the inductances. When a discharge takes place in the machining gap 6, the switching device 73 repeats the on-off of the high frequency for a given period of time T1 to generate the discharge and subsequently inserts a predetermined length of stop time T2. This operation is repeated for machining.

After the discharge occurrence, the capacitor discharge current 75 flows in the machining gap. However, since high-frequency oscillation components generated after the first half-wave of the capacitor discharge current are absorbed by the inductance of the coil 111 connected in parallel with the machining gap, the workpiece is machined with only the first half-wave of the high-frequency capacitor discharge current which does not have the direct-current arc portion. In addition, the switching device 73 is turned on/off at high frequency to suppress the generation of a persistent arc, thereby stabilizing the machining. Also, the vibration of the wire electrode is suppressed in wirecut electrical discharge machining to improve straightness. Such a circuit has a special effect when the switching device 73 is turned on/off at the high frequency of approximately 0.5 to 2 MHz.

Figure 29:
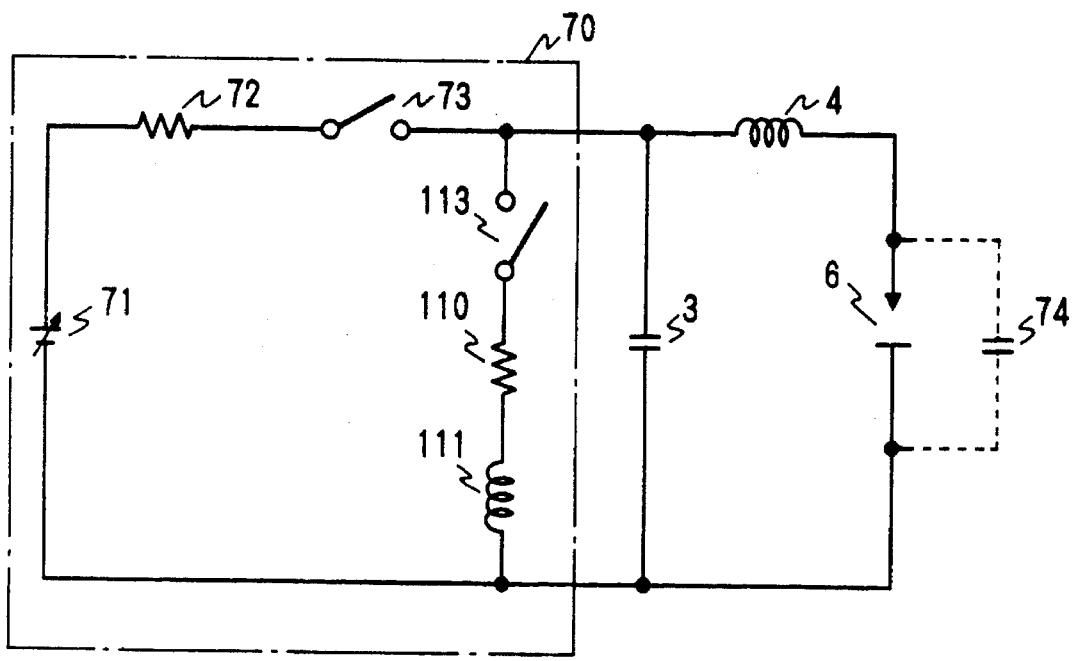
FIG. 29 illustrates a circuit arrangement in the fifteenth embodiment of the present invention.

The fifteenth embodiment of the present invention will now be described with reference to FIG. 29. FIG. 29 shows an example of an electrical discharge machine wherein a series circuit of a resistor, a coil and a switching device is inserted in parallel with a machining gap in an electrical discharge machine which uses a direct-current pulse for machining. In this drawing, 3 indicates a stray capacitance existing in feeder cables and the circuit, 4 designates a stray inductance existing in the feeder cables and a mechanical structure (e.g. feeding section), 6 denotes a machining gap formed by an electrode and a workpiece, 70 represents a direct-current pulse power supply which supplies a direct-current pulse voltage to the machining gap, 71 indicates a direct-current power supply, 72 represents a current limiting resistor, 73 designates a switching device, 110 denotes a resistor, 111 indicates a coil, 113 designates a switching device connected in series with the resistor 110 and the coil 111, 74 denotes a machining gap capacitance formed between the electrode and the workpiece, 30 represents a workpiece, and 31 indicates an electrode.

In operation, as in Embodiment 13, the direct-current pulse power supply 70 turns the switching device 73 on/off to apply a voltage determined by the voltage of the direct-current power supply 71 to the machining gap 6 for machining. Namely, when the switching device 73 is turned on, the voltage is applied to the machining gap via the current limiting resistor 72. When a discharge occurs in the machining gap 6, the switching device 73 is turned off and the switching device 113 is turned on to connect the coil 111 to the machining gap.

After the discharge occurrence, the capacitor discharge current 75 flows in the machining gap. However, since high-frequency oscillation components generated after the first half-wave of the capacitor discharge current are absorbed by the inductance of the coil 111 connected in parallel with the machining gap, the workpiece is machined with only the first half-wave of the capacitor discharge current which does not have the direct-current arc portion.

Further, since no current flows in the coil 111 at the application of the voltage until the discharge occurs, there is no loss within the circuit, the leading edge of the applied voltage is upgraded, and machining stability is improved.

Figure 30:
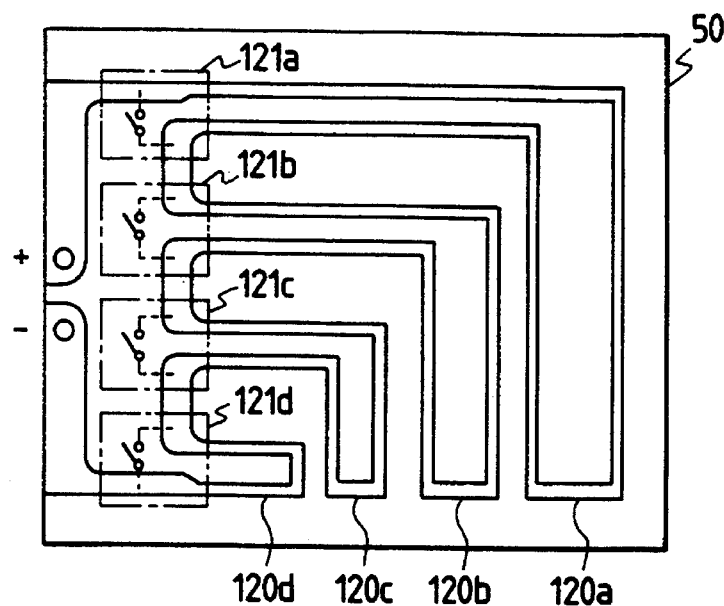
FIG. 30 illustrates an arrangement example of a variable inductance apparatus in a sixteenth embodiment of the present invention.
Figure 31:
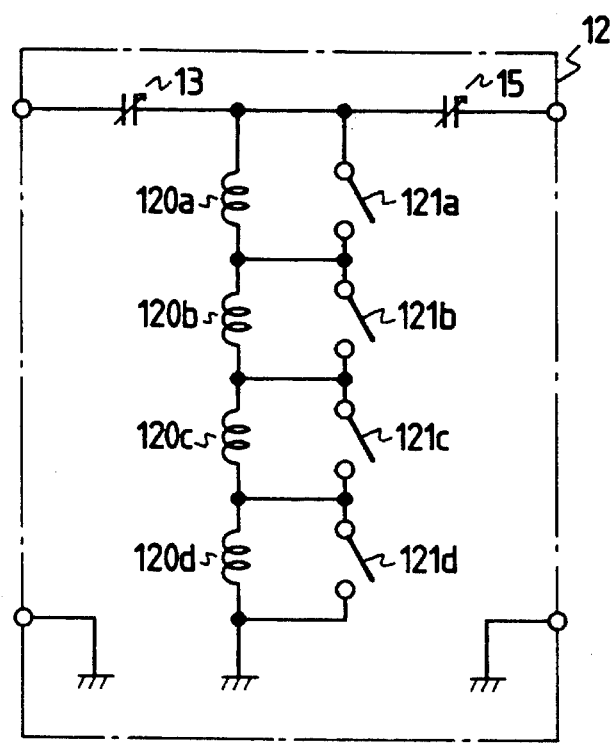
FIG. 31 illustrates a circuit example of the variable inductance apparatus in the sixteenth embodiment of the present invention.

The sixteenth embodiment of the present invention will now be described in accordance with FIGS. 30 and 31. In an electrical discharge machine, there are times when a machined area changes greatly, when power supply frequency changes and when a plurality of inductances must be switched in an impedance matching circuit. FIG. 30 shows an embodiment wherein a plurality of inductances in the impedance matching circuit 12 in such an electrical discharge machine are constituted by patterns on a printed circuit board. In the drawing, 50 indicates a printed circuit board, 120*a* to 120*d* represent print patterns formed on the printed circuit board 50, 121*a* to 121*d* denote relays connected in parallel with the print patterns 120*a* to 120*d* respectively. FIG. 30 shows an embodiment of the impedance matching circuit of the electrical discharge machine which employs said variable inductance means wherein 12 designates an impedance matching circuit, and 13 and 15 indicate variable capacitors.

Operation will now be described. When the relays 121*a* to 121*d* are opened by matching circuit control means in FIGS. 30 and 31 inductances are formed by the print patterns 120*a* to 120*d* and any of 16 steps of inductances can be selected by switching between the relays 121*a* to 121*d*. The inductance of each print pattern is determined by the width, length and pattern shape of the print pattern 120. The shapes of the print patterns 120*a* to 120*d* are preset so that their inductances have geometric series values of which coefficient is approximately 2 to ensure that any of 16 different consecutive inductances can be chosen according to the combination of the four print patterns.

Also, the composition result of low-level inductances existing in the relays 121*a* to 121*d* and said inductances is the actual sum of inductance values. To select the exact inductance value therefore consideration has been given to allow slightly smaller values to be set as the inductance values.

The inductances between the print patterns thus arranged in parallel on the printed circuit board can be designed and formed easily according to the shape of the print patterns and selected precisely with little accuracy variation in an especially small inductance area.

It will be appreciated that the example given for application to the impedance matching circuit of the electrical discharge machine in the preceding embodiment may also be used as a variable inductance apparatus for the matching circuit or the like of another high-frequency oscillator.

Figure 32:
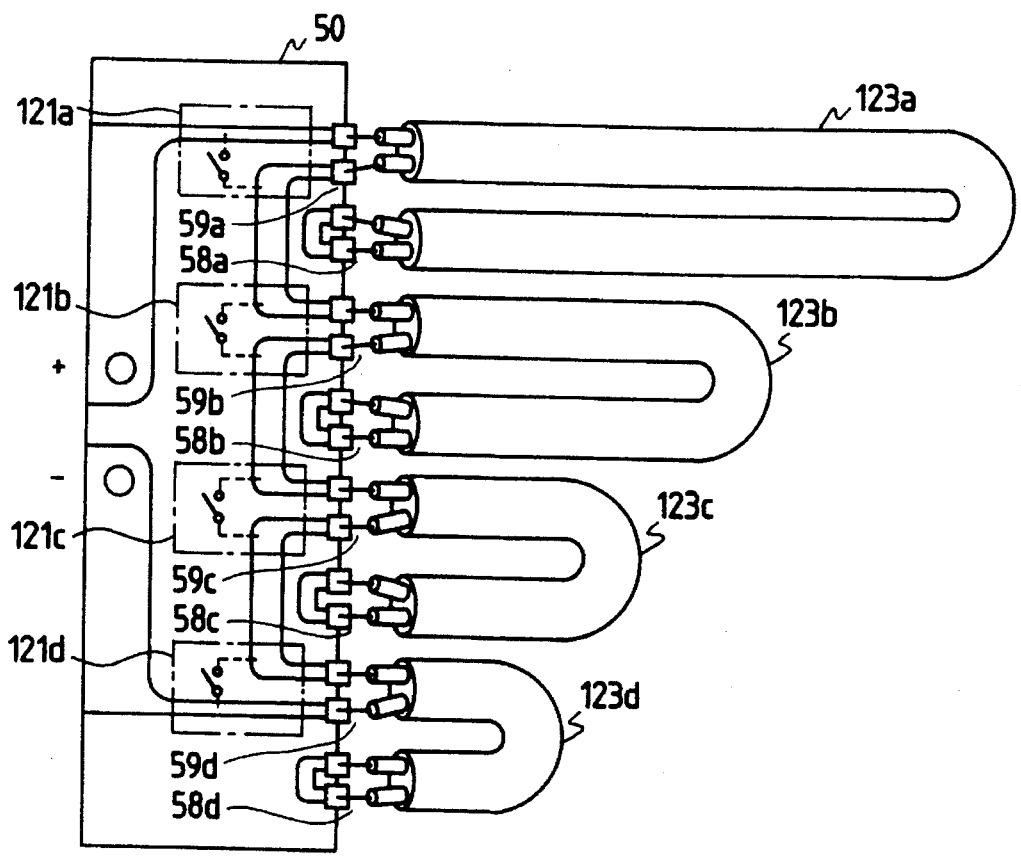
FIG. 32 illustrates an arrangement example of a variable inductance apparatus in a seventeenth embodiment of the present invention.
Figure 34:
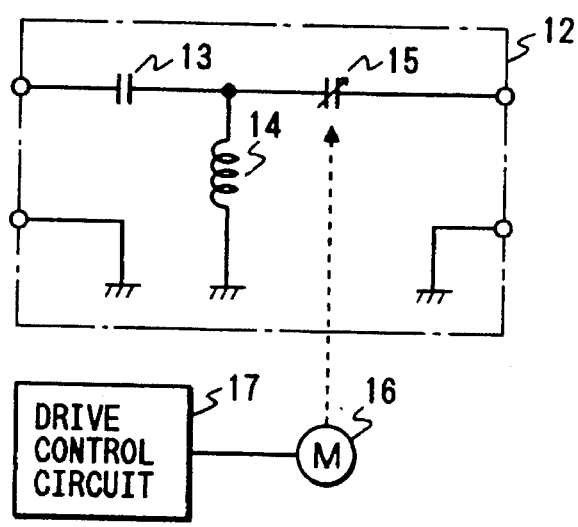
FIG. 34 illustrates the arrangement of an impedance matching circuit in the conventional electrical discharge machine.
Figure 33:
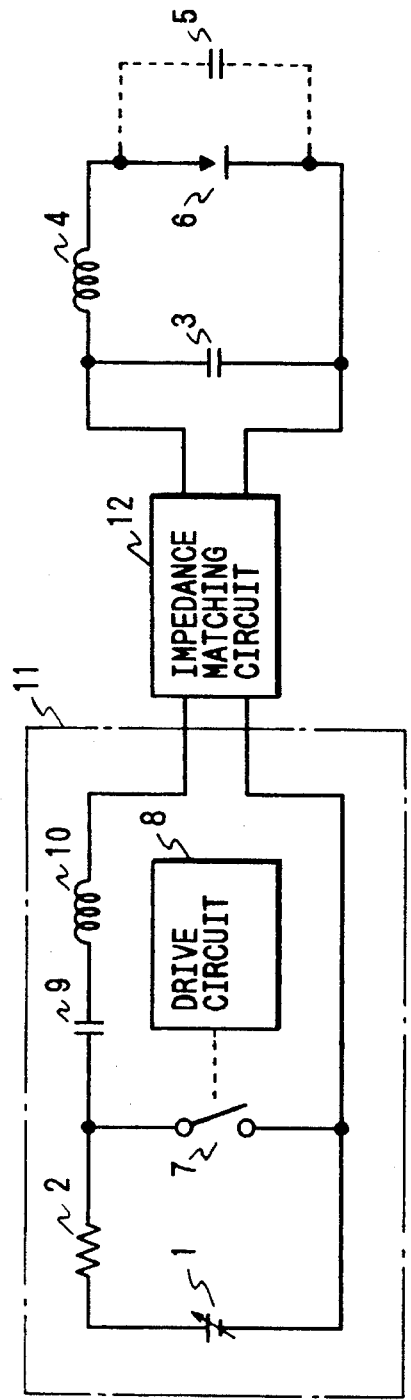
FIG. 33 illustrates the circuit arrangement of a conventional electrical discharge machine.
Figure 35:
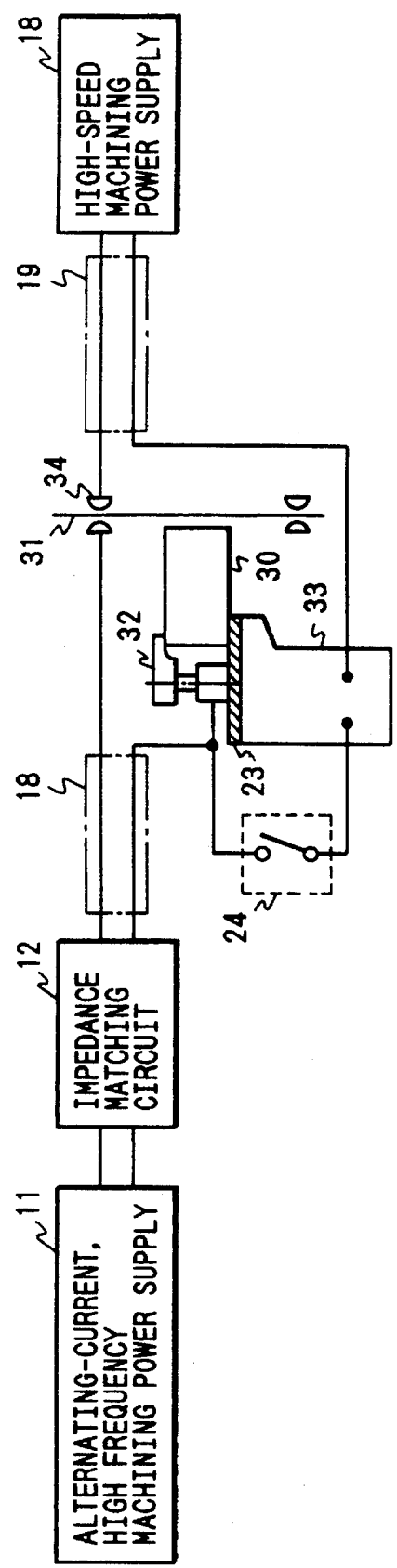
FIG. 35 illustrates the arrangement of the conventional electrical discharge machine.

The final embodiment 17 of the present invention will now be described with reference to FIG. 32. FIG. 32 shows an embodiment wherein a plurality of inductances in the impedance matching circuit 12 are formed by a plurality of cables different in inductance. In the drawing, 50 indicates a printed circuit board, 123*a* to 123*d* represent a plurality of cables of different lengths connected via terminals on the printed circuit board and connected to dummy terminals 58*a* to 58*d* at one end so as to be closed. 121*a* to 121*d* denote relays connected to the cables 123*a* to 123*d* via terminals 59*a* to 59*d* respectively.

Operation is similar to that in the sixteenth embodiment using the print patterns. When the relays 121*a* to 121*d* are opened by the matching circuit control means, inductances are formed by the cables 123*a* to 123*d* and any of 16 steps of inductances can be selected by switching between the relays 121*a* to 121*d*. The inductance of each cable is determined by the length or type of the cable. The inductances of the cables 123*a* to 123*d* are preset to have geometric series values of which coefficient is approximately 2 to ensure that any of 16 different consecutive inductance values can be chosen according to the combination of the four cables.

Also, the composition result of low-level inductances existing in the relays 121*a* to 121*d* and said inductances is the actual sum of inductance values. To select the exact inductance value, therefore, consideration has been given to allow slightly small values to be set as the inductance values.

It is recommended that since the coaxial cables as indicated in the fourth embodiment are generally large in capacitance parallel feeders or the like small in capacitance are used as the cables.

The inductances of the cables can thus be designed and formed easily according to the cable length and type, and are effective for a case where the inductance must be fine-tuned according to machines.

According to the present invention, as described above, impedance matching is conducted on the machining gap to suppress the influence of the capacitance of the high-speed machining feeder cables connected to the machining gap in finishing to allow machining without the electrostatic energy of the high-speed machining feeder cables being released to the machining gap, whereby an extremely high-quality machined surface of not more than 0.5 µmRmax can be provided stably and mirror machining is enabled to offer the best surface roughness of 0.2 µmRmax. Also, unlike the conventional art, the workpiece and surface plate need not be disconnected or connected by an insulating jig and the machining characteristic is not deteriorated in immersion machining, whereby machining accuracy, operability and costs are improved sharply.

Also, according to the present invention, the impedance matching circuit is provided between the direct-current pulse power supply or the bipolar pulse power supply and the machining gap and impedance matching is made on the machining gap so that the high-peak capacitor discharge current caused by the machining gap capacitance to flow after discharge occurrence prior to the direct-current does not occur to generate the discharge current of only the square-wave current for machining, whereby a machined surface of good quality can be provided especially in die-sinking electrical discharge machining or the like using oil as dielectric and electrode consumption is reduced remarkably. Also, a machined surface of high quality is obtained if the capacitance is large in the machining gap.

Also, according to the present invention, the impedance matching circuit is provided between the direct-current pulse power supply or the bipolar pulse power supply and the machining gap and the discharge is deignited to shut off the discharge arc after the high-peak capacitor discharge current caused by the machining gap capacitance to flow after discharge occurrence prior to the direct-current, square-wave current to perform impedance matching on the machining gap so that the direct-current, square-wave current does not persist after the capacitor discharge to generate the discharge current of only the capacitor discharge current for machining, whereby a machined surface of good quality can be provided especially in wirecut electrical discharge machining using water as dielectric and in the machining of materials, such as carbide materials, which are likely to result in faults, such as cracks, when the pulse width increases.

Also, according to the present invention, impedance matching is made on both polarities of the bipolar pulse voltage by the impedance matching circuits provided independently on both polarities for electrical discharge machining, whereby strict impedance matching can be performed on both polarities independently to provide a more excellent machining characteristic.

Also, according to the present invention, the plurality of capacitors and at least one coil are provided in the impedance matching circuit, switching means for switching between said plurality of capacitors is also provided, and the plurality of capacitors in the matching circuit are selected according to the machined area and machined plate thickness to perform impedance matching on the machining gap, whereby the impedance matching circuit is made simple in structure, fitted easily, and controlled considerably easily to provide a compact, low-cost machine.

Also, according to the present invention, the plurality of capacitors of the impedance matching circuit are constituted by the patterns or cables on the printed circuit board, whereby the capacitors can be designed and formed easily and the capacitances of high accuracy can be selected with little accuracy variation to achieve stable finishing. Also a low-cost, compact machine can be provided.

Also, according to the present invention, the plurality of capacitances in the impedance matching circuit are designed to have geometric series values of which coefficient is approximately 2, whereby linear capacitance switching can be carried out, in addition to said effects.

Also, according to the present invention, said plurality of capacitors in the impedance matching circuit are preset to have increased values in proportion to compensation made for the influence of the capacitance of the switching means which switches between the plurality of capacitances, whereby the influence of the capacitance of the switching means can be suppressed to change the sum of capacitances accurately, in addition to said effects.

Also, according to the present invention, a direct-current pulse voltage or bipolar pulse voltage is applied to the machining gap by the bypass circuit to generate a discharge and impedance matching is performed on the machining gap so that the capacitor discharge current caused by the machining gap capacitance to flow prior to the direct-current, square-wave current after discharge occurrence does not occur to generate the discharge current of only the square-wave current for electrical discharge machining, whereby a machined surface of good quality can be provided especially in die-sinking electrical discharge machining or the like using oil as dielectric and electrode consumption is reduced remarkably. Also, a machined surface of high quality is obtained if the capacitance is large in the machining gap.

Also, according to the present invention, a direct-current pulse voltage or bipolar pulse voltage is applied to the machining gap by the bypass circuit to generate a discharge and the discharge arc is shut off after the capacitor discharge current caused by the machining gap capacitance to flow prior to the direct-current, square-wave current after discharge occurrence to perform impedance matching on the machining gap so that the square-wave current does not persist to generate the discharge current of only the capacitor discharge current for electrical discharge machining, whereby a machined surface of good quality can be provided especially in wirecut electrical discharge machining using water as dielectric and in the machining of materials, such as carbide materials, which are likely to result in faults, such as crack, when the pulse width increases.

Also, according to the present invention, the series circuit consisting of the resistor and coil inserted in parallel with the machining gap causes the discharge arc to be shut off after the capacitor discharge current caused by the machining gap capacitance so that the square-wave current does not persist to generate the discharge current of only the capacitor discharge current for machining, whereby a machined surface of good quality can be provided especially in wirecut electrical discharge machining using water as dielectric and in the machining of materials, such as carbide materials, which are likely to result in faults, such as cracks, when the pulse width increases.

Also, according to the present invention, the series circuit consisting of the resistor and coil inserted in parallel with the machining gap is provided and the switching device for supplying the direct-current pulse is switched on/off repeatedly at high frequency for a predetermined period of time to shut off the discharge arc after the capacitor discharge current caused by the machining gap capacitance so that the square-wave current does not persist to generate the discharge current of only the capacitor discharge current for machining, whereby a machined surface of good quality can be provided especially in wirecut electrical discharge machining using water as dielectric and in the machining of materials, such as carbide materials, which are likely to result in faults, such as cracks, when the pulse width increases.

Also, according to the present invention, the switching device in the series circuit consisting of the resistor and switching device inserted in parallel with the machining gap is turned on immediately after a discharge to shut off the discharge arc after the capacitor discharge current caused by the machining gap capacitance so that the square-wave current does not persist to generate the discharge current of only the capacitor discharge current for machining, whereby a machined surface of good quality can be provided especially in wirecut electrical discharge machining using water as dielectric and in the machining of materials, such as carbide materials, which are likely to result in faults, such as cracks, when the pulse width increases.

Also, according to the present invention, the plurality of inductances of the impedance matching circuit are constituted by the capacitances of the patterns or cables on the printed circuit board, whereby the inductances can be designed and formed easily and inductance switching can be conducted precisely with little accuracy variation to achieve stable finishing. Also a low-cost, compact machine can be provided.

Also, according to the present invention, said plurality of inductances are preset to have decreased values in proportion to compensation made for the influence of the inductance of the switching means which switches between said plurality of inductances, whereby the influence of the inductance of the switching means can be suppressed to change the sum of inductances accurately, in addition to said effects.

Also, according to the present invention, the plurality of capacitors of the variable capacitance apparatus used with the impedance matching circuit or the like of the electrical discharge machine are constituted by the capacitances of the patterns or cables on the printed circuit board, whereby the capacitors can be designed and formed easily and capacitance switching can be performed precisely with little accuracy variation to achieve stable finishing. Also a low-cost, compact machine can be provided.

Also, according to the present invention, said plurality of capacitors are preset to have increased values in proportion to compensation made for the influence of the capacitance of the switching means which switches between the plurality of capacitances of said variable capacitance apparatus, whereby the influence of the capacitance of the switching means can be suppressed to change the sum of capacitances accurately, in addition to said effects.

Also, according to the present invention, the plurality of inductances of the variable inductance apparatus used with the impedance matching circuit or the like of the electrical discharge machine are constituted by the capacitances of the patterns or cables on the printed circuit board, whereby the inductances can be designed and formed easily and inductance switching can be made precisely with little accuracy variation to achieve stable finishing. Also a low-cost, compact machine can be provided.

Further, according to the present invention, said plurality of inductances are preset to have decreased values in proportion to compensation made for the influence of the inductance of the switching means which switches between the plurality of inductances of said variable inductance apparatus, whereby the influence of the inductance of the switching means can be suppressed to change the sum of inductances accurately, in addition to said effects.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. An electrical discharge machine for supplying a high peak current to a machining gap formed between an electrode and a workpiece to machine the workpiece at high speed and supplying an alternating-current, high-frequency current to said machining gap to finish the workpiece, comprising:

high-speed machining feeder cables connected electrically to the electrode and the workpiece at one end, which electrical connection is maintained during both high-speed machining and finishing;

alternating-current, high-frequency machining feeder cables connected electrically to the electrode and the workpiece at one end;

a high-speed machining power supply for supplying said machining gap with the high peak current through said high-speed machining feeder cables in high-speed machining;

an alternating-current, high-frequency machining power supply for supplying the machining gap with the alternating-current, high-frequency current through said alternating-current, high-frequency machining feeder cables in finishing; and an impedance matching circuit for conducting impedance matching on the machining gap to suppress the influence of the capacitance of the high-speed machining feeder cables when they are electrically connected to the electrode and the workpiece in finishing.

2. An electrical discharge machine as set forth in claim 1 wherein said alternating-current, high-frequency machining power supply is operative at least at a frequency within a range of approximately 7–30 MHz.

3. The electrical discharge machine as set forth in claim 1, wherein said impedance matching circuit causes a reflection at a terminal portion of the high-speed machining feeder cables, such that current does not flow into the high-speed machining feeder cables.

4. An electrical discharge machine as set forth in claim 1, further comprising:

a surface plate for supporting the workpiece, wherein the surface plate is not electrically isolated from the workpiece during finishing.

5. The electrical discharge machine as set forth in claim 1, wherein the alternating current, high-frequency machining feeder cables are electrically coupled to the electrode and the workpiece.

6. The electrical discharge machine as set forth in claim 5, further comprising a workpiece clamping jig, wherein the alternating current, high-frequency machining feeder cables are electrically coupled to the electrode through said workpiece clamping jig.

7. The electrical discharge machine as set forth in claim 5, further comprising a magnet, wherein the alternating current, high-frequency machining feeder cables are fixed to the workpiece by said magnet.

8. The electrical discharge machine as set forth in claim 5, further comprising a dielectric nozzle coupled to the electrode and a feeding contactor coupled to one end of the dielectric nozzle, wherein the alternating current, high-frequency machining feeder cables are electrically coupled to the workpiece through the feeding contactor.

9. An electrical discharge machining method, comprising the steps of:

supplying a high peak current to a machining gap formed between an electrode and a workpiece through high-speed machining feeder cables to machine the workpiece at high speed, said high-speed machining feeder cables being electrically connected to the electrode during both high-speed machining and finishing;

supplying an alternating-current, high-frequency current to said machining gap through alternating-current, high-frequency machining feeder cables to finish the workpiece at high accuracy; and conducting impedance matching on the machining gap to suppress the influence of the impedance of the high-speed machining feeder cables when they are electrically connected to the machining gap in finishing.

10. The electrical discharge machining method as set forth in claim 9, further comprising:

supplying said alternating-current high-frequency current at a frequency within a range of approximately 7–30 MHz.

11. The electrical discharge machining method as set forth in claim 9, wherein said conducting step includes causing a reflection at a terminal portion of the high-speed machining feeder cables, such that current does not flow through the high-speed machining feeder cables.

12. The electrical discharge machining method as set forth in claim 9 further comprising:

switching among plural impedances in order to provide said impedance matching.

13. The electrical discharge machining method as set forth in claim 12 further comprising:

switching among plural impedances and selecting an appropriate matching value in consideration of the impedance of the switching apparatus itself.

* * * * *